United States Patent
Yamamoto

(10) Patent No.: US 11,023,399 B2
(45) Date of Patent: Jun. 1, 2021

(54) TRANSFER CONTROL DEVICE, TRANSFER DEVICE, TRANSFER CONTROL METHOD, AND TRANSFER CONTROL PROGRAM

(71) Applicant: NEC Platforms, Ltd., Kawasaki (JP)

(72) Inventor: Takahito Yamamoto, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/476,328

(22) PCT Filed: Jan. 15, 2018

(86) PCT No.: PCT/JP2018/000828
§ 371 (c)(1),
(2) Date: Jul. 8, 2019

(87) PCT Pub. No.: WO2018/135437
PCT Pub. Date: Jul. 26, 2018

(65) Prior Publication Data
US 2020/0042476 A1    Feb. 6, 2020

(30) Foreign Application Priority Data

Jan. 19, 2017 (JP) .............................. JP2017-007613

(51) Int. Cl.
  *G06F 13/28*    (2006.01)
(52) U.S. Cl.
  CPC .................................. *G06F 13/28* (2013.01)
(58) Field of Classification Search
  None
  See application file for complete search history.

(56) References Cited

U.S. PATENT DOCUMENTS 8,959,261 B2 *  2/2015  Ohta ...................... G06F 13/28
                                                                710/39
9,684,615 B1   6/2017  Nguyen et al.
(Continued)

FOREIGN PATENT DOCUMENTS

JP    2005-165619 A    6/2005
JP    2005-258509 A    9/2005
(Continued)

OTHER PUBLICATIONS

English Translation of JP 2005-258509 A (Fujitsu Ltd.) Sep. 22, 2005 (Year: 2005).*
(Continued)

*Primary Examiner* — Farley Abad
*Assistant Examiner* — Dayton Lewis-Taylor

(57) ABSTRACT

A problem addressed by the present invention is to provide a transfer control device, etc., with which it is possible to reduce the number of occurrences of sending and receiving processes which a management device carries out when information is transferred among recording units. To solve the problem, provided is a transfer control device comprising: a transfer processing unit which, using each of a plurality of instances of management information, carries out an information transfer from a first recording unit to a second recording unit; an assessment unit which carries out an assessment about whether or not to carry out an update by assessing completion of partial transfers, each of which corresponds to the information transfer having been associated with each of the plurality of instances of the management information, on the basis of contracted information which represents a completion status of the partial transfers.

20 Claims, 19 Drawing Sheets

(56) References Cited

U.S. PATENT DOCUMENTS

| | | |
|---|---|---|
| 2004/0243738 A1 | 12/2004 | Day et al. |
| 2006/0161694 A1 | 7/2006 | Tomozaki et al. |
| 2007/0130381 A1 | 6/2007 | Sasaki et al. |
| 2007/0174509 A1 | 7/2007 | Day et al. |
| 2010/0095037 A1 | 4/2010 | Kyusojin et al. |
| 2010/0268852 A1 | 10/2010 | Archer et al. |
| 2012/0233372 A1 | 9/2012 | Ohta et al. |

FOREIGN PATENT DOCUMENTS

| | | |
|---|---|---|
| JP | 2006-195823 A | 7/2006 |
| JP | 2007-128425 A | 5/2007 |
| JP | 2009-187313 A | 8/2009 |
| WO | 2011/155096 A1 | 12/2011 |

OTHER PUBLICATIONS

English Translation of JP 2005-165619 A (Hitachi, Ltd.) Jun. 23, 2005 (Year: 2005).*
International Search Report for PCT Application No. PCT/JP2018/000828, dated Mar. 27, 2018.
English translation of Written opinion for PCT Application No. PCT/JP2018/000828.
Extended European Search Report for EP Application No. EP18741721.7 dated Oct. 16, 2020.

* cited by examiner

TRANSFER CONTROL DEVICE, TRANSFER DEVICE, TRANSFER CONTROL METHOD, AND TRANSFER CONTROL PROGRAM This application is a National Stage Entry of PCT/JP2018/000828 filed on Jan. 15, 2018, which claims priority from Japanese Patent Application 2017-007613 filed on Jan. 19, 2017, the contents of all of which are incorporated herein by reference, in their entirety.

TECHNICAL FIELD

The present invention relates to a transfer device that transfers information from a certain recording device to another recording device.

BACKGROUND ART

DMA transfer being one data transfer system between a main memory of an information processing device and a peripheral equipment connection unit and the like is commonly known. Here, DMA is an abbreviation of direct memory access. In DMA transfer, in order to reduce a load on a CPU being a management device that manages DMA transfer, data transfer is executed between a main memory and a peripheral equipment connection unit and the like without intervention of a CPU. Here, CPU is an abbreviation of a central processing unit.

A CPU issues an instruction of data transfer to a controller (transfer control unit) used for DMA transfer. Then, the controller having received the instruction acquires management information including a content of DMA transfer processing from a descriptor and executes data transfer in accordance with the management information. Here, management information is information such as information of a transfer source and a transfer destination, information of transfer data, and the like. Further, a descriptor is a predetermined storage area storing management information.

PTL 1 discloses a method of storing management information via division into sub-descriptors configuring a descriptor and executing data transfer, based on a portion of management information stored on each sub-descriptor.

Further, PTL 2 discloses a descriptor control method of collectively reading two or more pieces of disposed instruction descriptor information and writing two or more pieces of only reply descriptor information as a batch.

Further, PTL 3 discloses a start processing device that acquires an event that occurs on a computer system and starts a DMA controller that controls data transfer between a peripheral device and a storage device when the acquired event and a registered event are matched with each other.

CITATION LIST

Patent Literature

PTL 1: Japanese Unexamined Patent Application Publication No. 2006-195823
PTL 2: Japanese Unexamined Patent Application Publication No. 2009-187313
PTL 3: Japanese Unexamined Patent Application Publication No. 2007-128425

SUMMARY OF INVENTION

Technical Problem

In order for a management device (CPU) to confirm transfer termination of transfer information in the method described in PTL 1, it is generally conceivable that a transfer control unit transmits interrupt information to the management device every time transfer processing for each piece of divided management information is terminated. In the method, the management device reads, every time receiving transmission of interrupt information, termination information stored on each of the sub-descriptors.

However, in the method, a large number of transmission/reception processings for acquiring termination information by the management device occur between the management device and the transfer control device. The transmission/reception processings may interfere with other transmission/reception processings necessary for transfer processing.

An object of the present invention is to provide a transfer control device and the like capable of reducing the number of times of occurrences of transmission/reception processing executed by a management device upon information transfer executed between recording units.

Solution to Problem

A transfer control device of the present invention includes: a transfer processing means that executes an information transfer from a first recording means to a second recording means, based on each of a plurality of pieces of management information; a determination means that determines whether to execute an update of contracted information representing a termination status of a partial transfer being the information transfer associated with each of the plurality of pieces of the management information, by determining a termination of each of the partial transfers; an update means that executes the update when the determination means determines that the update is to be executed; and a storage means that stores the contracted information and is able to provide the contracted information for a management device.

Advantageous Effects of Invention

The transfer control device and the like of the present invention are able to reduce the number of times of occurrences of transmission/reception processing executed by a management device upon information transfer executed between recording units.

EXAMPLE EMBODIMENT

Configuration and Operation

Figure 1:
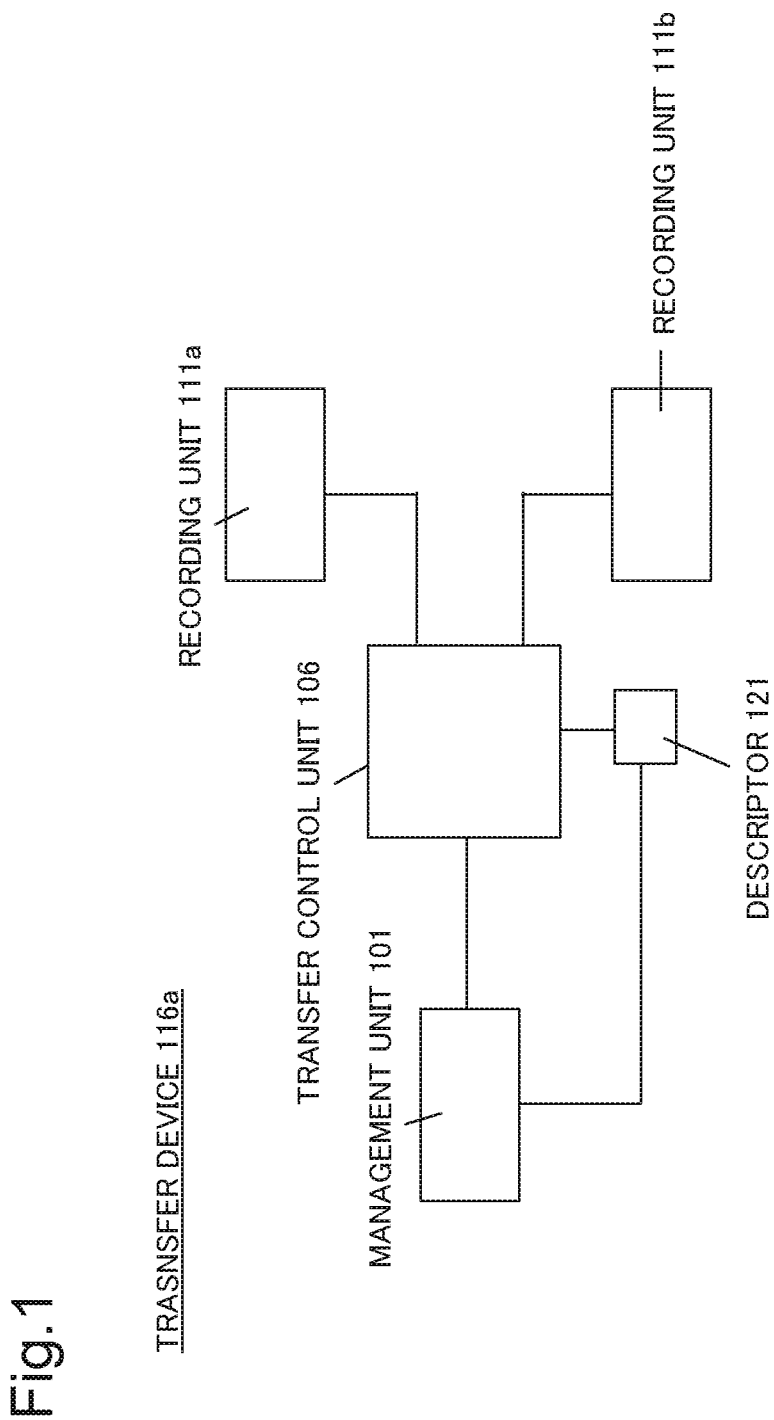
FIG. 1 is a diagram illustrating a configuration example of a transfer device of the present example embodiment.

FIG. 1 is a diagram illustrating a configuration of a transfer device 116a that is an example of a transfer device of the present example embodiment.

The transfer device 116a includes a management unit 101, a transfer control unit 106, a descriptor 121, and recording units 111a and 111b.

The transfer device 116a is a device that executes DMA information transfer from the recording unit 111a to the recording unit 111b. Here, DMA is an abbreviation of direct memory access.

The management unit 101 manages information transfer processing from the recording unit 111a to the recording unit 111b executed by the transfer control unit 106.

The descriptor 121 is a recording area that stores management information for DMA transfer. The management information includes transfer information relating to DMA transfer processing such as information representing a transfer source, information representing a transfer destination, information representing transfer target information, and the like. The information representing the transfer source is, for example, an address of the transfer source. Further, the information representing the transfer destination is, for example, an address of the transfer destination. Further, the information representing the transfer target information is information capable of identifying, for example, which portion of a transfer target division transfer information, which is divided transfer target information, is. Division transfer information is a portion of transfer target information associated with division management information.

Note that, the management information may also be referred to as a transfer parameter.

The descriptor 121 is divided into a plurality of portions (entries) as described later with reference to FIG. 2. Further, each entry is assigned with a number. The descriptor 121 stores each piece of division management information being divided management information on each of the plurality of entries. Hereinafter, information stored on an entry is referred to as "entry information".

The management unit 101 issues a storage instruction of management information to the descriptor 121, issues an instruction of transfer processing to the transfer control unit 106, acquires termination information of started transfer processing, and the like. Here, termination information is information representing a termination status of the transfer. The termination information may include exceptional termination information representing a presence/absence of an exceptional termination.

The management unit 101 stores each piece of the division management information on each of a plurality of entries of the descriptor 121. Each piece of division management information is associated with each portion of transfer information that is a target of a transfer executed by the transfer device 116a.

The management unit 101 is, for example, a computer as a hardware configuration.

The management unit 101 acquires the termination information by transmitting interrupt information (a second notification) from the transfer control unit 106. The termination information is completion information or exceptional termination information of transfer processing stored on each entry of the descriptor 121. Exceptional termination and exceptional termination information will be described later in description of FIG. 4. The management unit 101 acquires termination information recorded on each entry every time interrupt information is transmitted from the transfer control unit 106.

The management unit 101 further reads the contracted information stored on the transfer control unit 106 at a timing of a predetermined time interval. Then, the management unit 101 interprets a termination status of transfer processing for which an instruction is issued by the management unit 101, based on the read contracted information. The management unit 101 outputs information representing the transfer termination status. The output is presentation of the termination status, for example, to a user of the transfer device 116a. The presentation is presentation of the completion status, for example, to a display unit, not illustrated, included in the management unit 101.

Note that the descriptor 121 is a recording area of a recording device as a hardware configuration. The recording device is a hard disk, a semiconductor memory, or the like.

The transfer control unit 106 executes information transfer processing from the recording unit 111a to the recording unit 111b in accordance with a start instruction of transfer processing from the management unit 101.

The transfer control unit 106 acquires, as the transfer processing, transfer information by transmitting a read request to the recording unit 111a. The transfer control unit 106 further transmits acquired division transfer information to the recording unit 111b at a timing at which the recording unit 111b may record the division transfer information.

The transfer control unit 106 further stores the termination information on the descriptor 121. The transfer control unit 106 executes the storage every time determining that a transfer of division transfer information corresponding to division management information stored on one entry of the descriptor 121 has been terminated. The transfer control unit 106 further executes the storage for an entry that stores division management information subjected to the determination.

The transfer control unit 106 further stores contracted information representing a termination status relating to division management information stored on each entry of the descriptor 121. Contracted information includes, among pieces of division management information relating to transfer processing being executed, information representing a piece of division management information in which transfer processing is started earliest.

However, there may be a plurality of pieces of division management information in which transfer processing is started earliest. Further, in this case, "earliest" does not necessarily indicate strictly earliest and may indicate substantially the same time.

When transfer processing is started in a number order of entry information, the information included in contracted information is a number of entry information having a weakest number.

The transfer control unit 106 updates the contracted information, based on termination information. Note that an example of contracted information is described later with reference to FIG. 5.

The transfer control unit 106 further transmits the interrupt information described above to the management unit 101. The transfer control unit 106 transmits the interrupt information every time determining that the transfer described above has been terminated.

Figure 2:
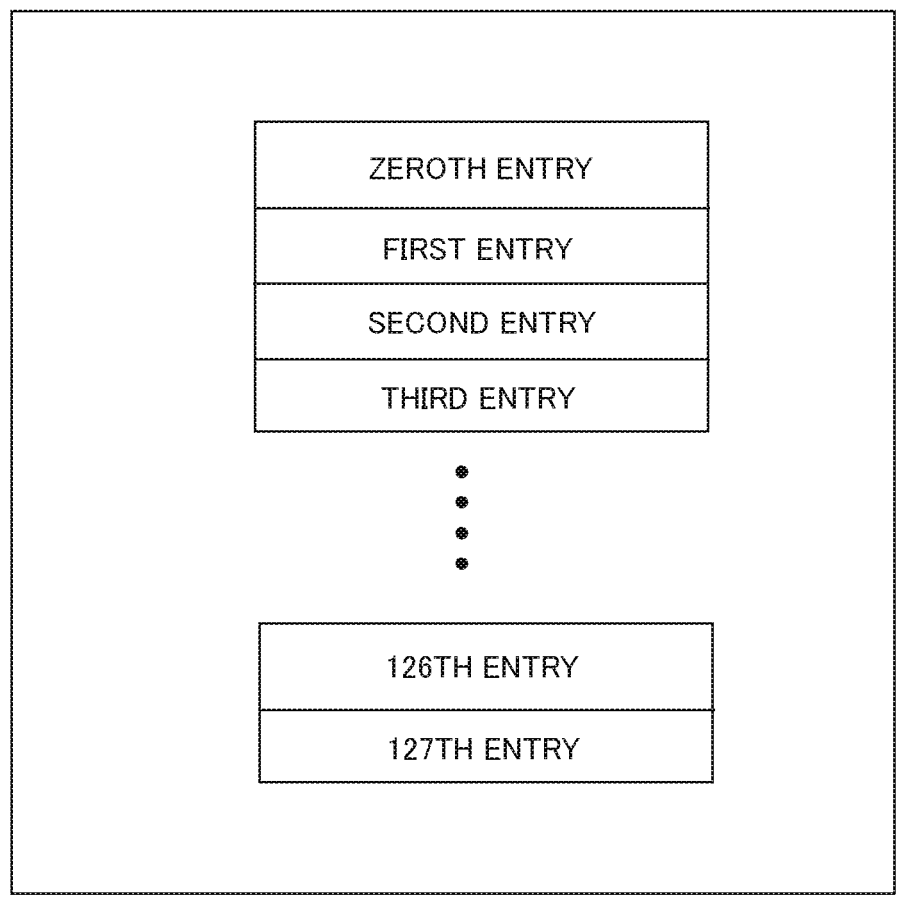
FIG. 2 is a conceptual diagram illustrating a configuration example of a descriptor.

FIG. 2 is a conceptual diagram illustrating a configuration of a descriptor 121a being an example of the descriptor 121 illustrated in FIG. 1.

The descriptor 121a is divided into 128 entries ranging from a zeroth entry to a 127th entry. Each piece of division management information is stored on each entry. The number of entries used at that time is not necessarily 128 in total and is a number necessary for storing the management information.

While the descriptor 121a is an example of the descriptor 121 illustrated in FIG. 1, including 128 entries, the number of entries included in the descriptor 121 is optional.

Figure 3:
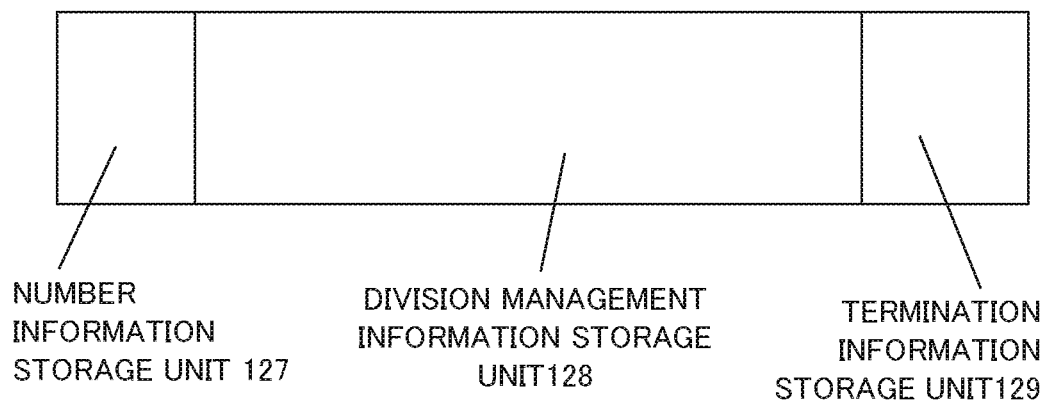
FIG. 3 is a conceptual diagram illustrating a configuration example of entry information.

FIG. 3 is a conceptual diagram illustrating a configuration of entry information 126 that is an example of information recorded on each of the zeroth to 127th entries illustrated in FIG. 2.

The entry information 126 includes a number information storage unit 127, a division management information storage unit 128, and a termination information storage unit 129.

The number information storage unit 127 stores information representing a number of an entry storing the entry information 126.

The division management information storage unit 128 stores the division management information described above.

The termination information storage unit 129 stores the termination information described above. When there is no termination information described above, the termination information storage unit 129 does not exist, the termination information storage unit 129 is vacant, or the termination information storage unit 129 stores information other than termination information.

The termination information storage unit 129 may not necessarily exist.

Figure 4:
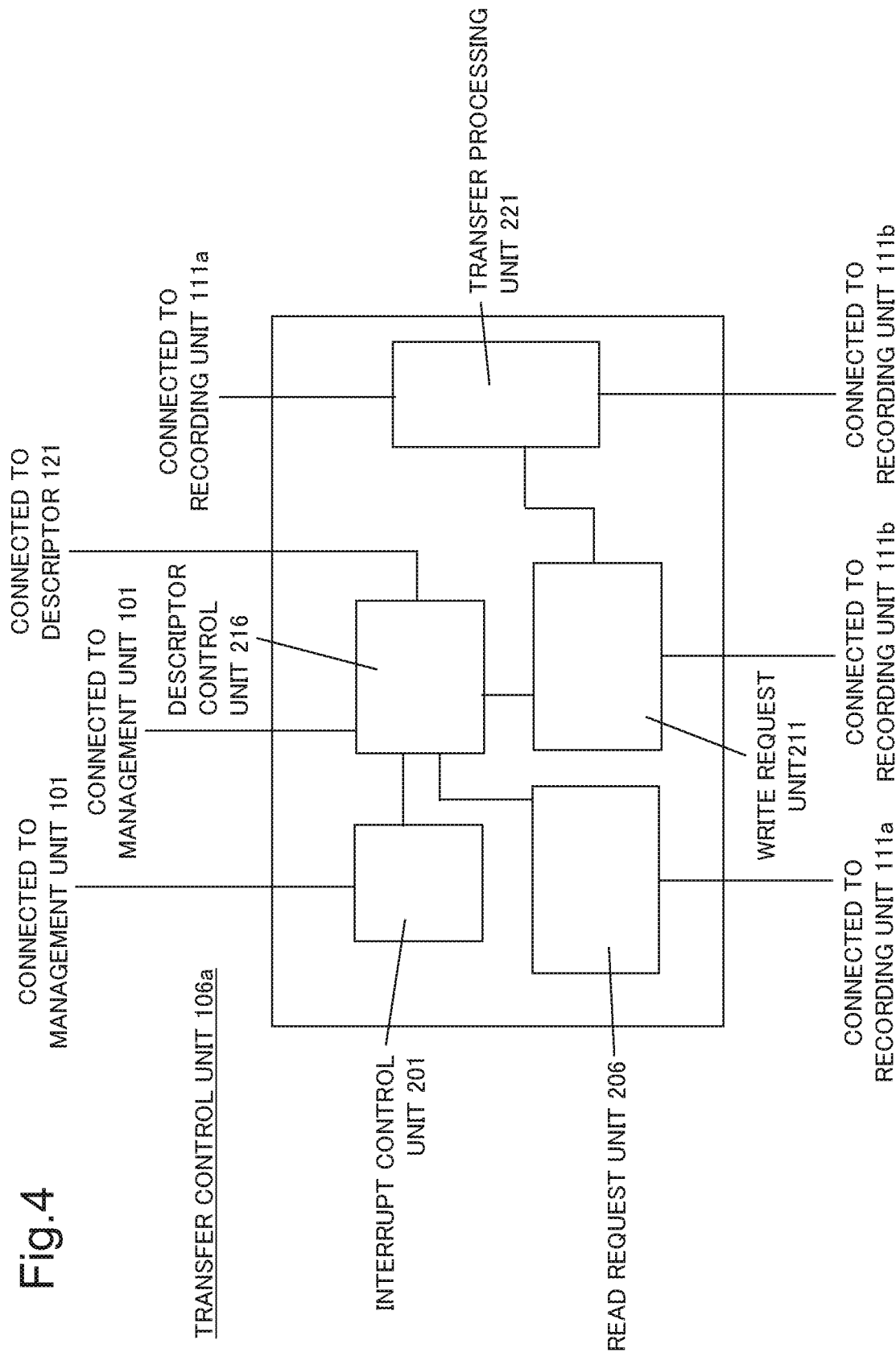
FIG. 4 is a conceptual diagram illustrating a configuration example of a transfer control unit.

FIG. 4 is a conceptual diagram illustrating a configuration of a transfer control unit 106a that is an example of the transfer control unit 106 illustrated in FIG. 1.

The transfer control unit 106a includes an interrupt control unit 201, a read request unit 206, a write request unit 211, a descriptor control unit 216, and a transfer processing unit 221.

The descriptor control unit 216 controls information transfer processing from the recording unit 111a to the recording unit 111b, based on management information stored on the descriptor 121 in accordance with an instruction from the management unit 101 illustrated in FIG. 1. A procedure of the control is, for example, as follows.

The descriptor control unit 216 first identifies one entry and reads division management information stored on the entry.

The descriptor control unit 216 then instructs the read request unit 206 to transmit a read request of division transfer information identified by the division management information to the recording unit 111a. The read request unit 206 receives the instruction and transmits the read request to the recording unit 111a. Then, the recording unit 111a transmits the division transfer information to the transfer processing unit 221.

Next, the descriptor control unit 216 instructs the write request unit 211 to transmit a write request of the division transfer information specified by the division management information to the recording unit 111b. The write request unit 211 receives the instruction and transmits the write request to the recording unit 111b. Then, the recording unit 111b records the division transfer information transmitted from the transfer processing unit 221. When completing the record, the recording unit 111b transmits completion information being information representing that a transfer has been completed to the descriptor control unit 216 through the write request unit 211.

A termination of a write operation may be exceptionally executed (hereinafter, referred to as an "exceptional termination") although recording on the recording unit 111b has not been completed. An operation of the exceptional termination will be described later in description of the descriptor control unit 216.

The descriptor control unit 216 records the completion information described above or exceptional termination information on the descriptor 121 in association with the one entry of the descriptor 121. Here, exceptional termination information is information representing that an exceptional termination has occurred.

The descriptor control unit 216 then instructs the interrupt control unit 201 to transmit interrupt information (a second notification) to the management unit 101 illustrated in FIG. 1. Here, interrupt information is information for causing the management unit 101 to confirm a termination status of a transfer.

The descriptor control unit 216 executes the operation described above for all entries that store the division management information.

The descriptor control unit 216 may execute the exceptional termination described above. The exceptional termination is executed when, for example, a violation in an address space of a transfer source or a transfer destination has been detected. A violation in the address space occurs, for example, when a logical address space that does not exist is accessed and when accesses exceeding a real capacity of a memory occur (a capacity excess of a physical address). A violation in the address space occurs when, for example, an area access-prohibited by an OS and the like operating the descriptor control unit 216 is accessed. Here, an OS is an abbreviation of an operation system. The address space is managed by the OS, and the descriptor control unit 216 converts a logical address to a physical address, based on a conversion table. The descriptor control unit 216 then executes the exceptional termination when there is a violation upon execution of the conversion.

The descriptor control unit 216 generates the exceptional termination information described above when executing the exceptional termination.

The descriptor control unit 216 further stores the contracted information described above on a retaining unit, not illustrated, included in the descriptor control unit 216. The descriptor control unit 216 updates, when termination information is transmitted via the write request unit 211 from the recording unit 111b, the contracted information in a predetermined case. It will be described later in what case the descriptor control unit 216 updates contracted information.

The read request unit 206 receives a transmission instruction of the read request described above transmitted from the descriptor control unit 216 and transmits the read request to the recording unit 111a in accordance with an instruction content thereof.

The write request unit 211 receives a transmission instruction of the write request described above transmitted from the descriptor control unit 216 and transmits the write request to the recording unit 111b in accordance with an instruction content thereof. The write request unit 211 executes the transmission upon receiving transmission of notification information representing that, for example, the partial information transmission from the transfer processing unit 221 to the recording unit 111b has been prepared. The write request unit 211 issues a notification (a first notification) to the transfer processing unit 221 synchronously with the transmission of a write request to the recording unit 111b. The first notification is a notification for causing the transfer processing unit 221 to transmit division transfer information to the recording unit 111b.

The interrupt control unit 201 receives a transmission instruction of the interrupt information described above transmitted from the descriptor control unit 216 and transmits the interrupt information to the management unit 101 illustrated in FIG. 1 in accordance with an instruction content thereof. Note that it is assumable that the interrupt control unit 201 does not exist.

The transfer processing unit 221 transmits division transfer information read from the recording unit 111a to the recording unit 111b at a predetermined timing. In other words, the transfer processing unit 221 reads the division transmission information and transmits the notification information described above to the write request unit 211. Transmission of the first notification described above by the write request unit 211 is received and the division transfer information is transmitted to the recording unit 111b.

Figure 5:
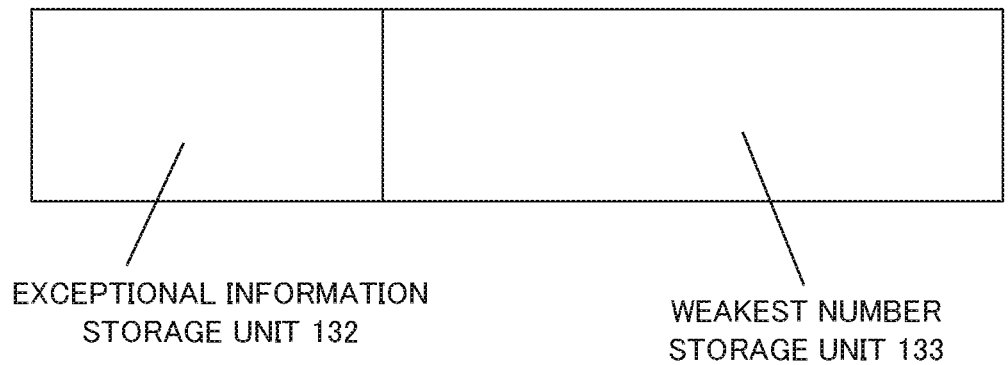
FIG. 5 is a diagram illustrating an example of contracted information.

FIG. 5 is a diagram illustrating contracted information 131 that is an example of the contracted information described above.

The contracted information 131 includes an exceptional information storage unit 132 and a weakest number storage unit 133.

The exceptional information storage unit 132 stores information representing whether or not exceptional termination has been performed.

The weakest number storage unit 133 stores, during execution of transfer processing of a series of pieces of entry information, a number of a youngest number among numbers of pieces of entry information relating to transfer processing being executed.

Information stored on the weakest number storage unit 133 before start or after termination of the transfer processing is optional. For example, before start of the transfer processing, the weakest number storage unit 133 may store a smallest number of numbers of a series of pieces of entry information. Further, for example, after termination of the transfer processing, the weakest number storage unit 133 may store a number larger than a largest number of numbers of a series of pieces of entry information.

Figure 6:
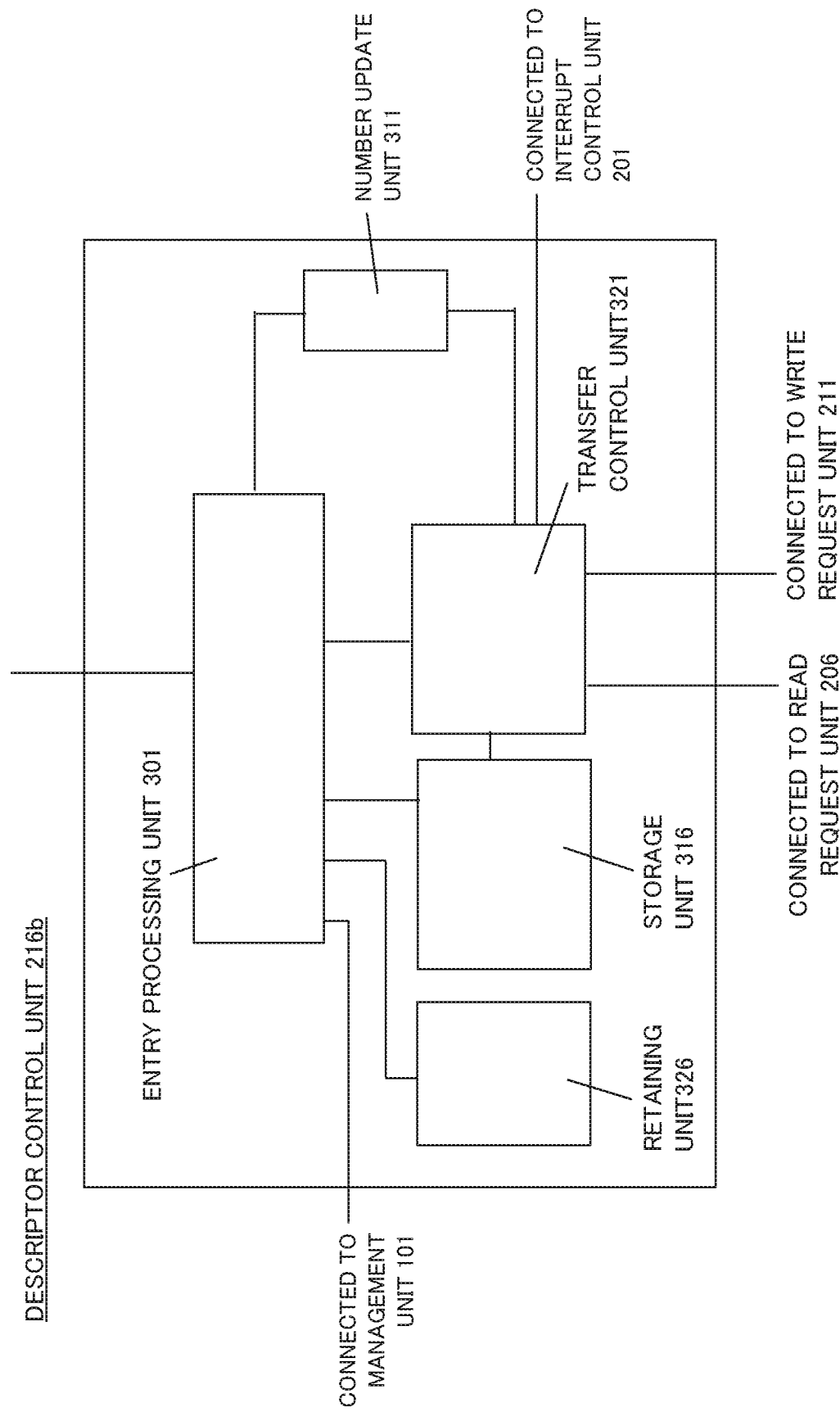
FIG. 6 is a conceptual diagram illustrating a configuration example of a descriptor control unit.

FIG. 6 is a conceptual diagram illustrating a configuration of a descriptor control unit 216b that is an example of the descriptor control unit 216 illustrated in FIG. 4.

A descriptor control unit 216a includes an entry processing unit 301, a number update unit 311, a storage unit 316, a transfer control unit 321, and a retaining unit 326.

The entry processing unit 301 receives transmission of instruction information of a transfer start from the management unit 101 and reads next entry information (see the entry information 126 illustrated in FIG. 3) from the descriptor 121. The entry information is entry information that stores the division management information described above and a smallest number. The entry processing unit 301 stores the read entry information on the storage unit 316. The entry processing unit 301 further stores a number included in the entry information on the number update unit 311.

The transfer control unit 321 updates entry information stored on the storage unit 316 and thereby instructs the read request unit 206 illustrated in FIG. 4 to transmit a read request to the recording unit 111a in accordance with updated division management information. Further, the transfer control unit 321 instructs the write request unit 211 illustrated in FIG. 4 to transmit a write request to the recording unit 111b in accordance with the updated division management information.

The transfer control unit 321 transmits, when the termination information described above arrives from the write request unit 211 illustrated in FIG. 4, the termination information to the entry processing unit 301. The transfer control unit 321 further issues a notification (a second notification) to the number update unit 311. The transfer control unit 321 further instructs the interrupt control unit 201 illustrated in FIG. 4 to transmit interrupt information to the management unit 101 illustrated in FIG. 1.

The retaining unit 326 stores contracted information (see the contracted information 131 illustrated in FIG. 5).

The entry processing unit 301 receives transmission of the termination information from the transfer control unit 321 and stores the termination information on a termination information storage unit (see the termination information storage unit 129 illustrated in FIG. 3) of entry information stored on the storage unit 316. At that time, the transfer control unit 321 may delete division management information (see the division management information storage unit 128 illustrated in FIG. 3) stored in the entry information. The transfer control unit 321 stores entry information that stores the termination information in an entry of a number included in the entry information.

The entry processing unit 301 further receives transmission of the termination information from the transfer control unit 321 and updates the contracted information stored on the retaining unit 326.

Note that, the entry processing unit 301 may store, when entry information stored on the storage unit 316 includes a termination information storage unit (see the termination information storage unit 129 illustrated in FIG. 3), the termination information on the termination information storage unit.

The number update unit 311 receives the second notification, increases a stored number by one, and transmits the increased number to the entry processing unit 301.

The entry processing unit 301 receives number transmission from the number update unit 311 and reads entry information stored on an entry of the number in the descriptor 121. The entry processing unit 301 then replaces entry information stored on the storage unit 316 with the read entry information for the storage unit 316.

Hereinafter, components of the descriptor control unit 216a execute processing similar to the processing described above, based on newly read entry information.

The processing described above is executed for all pieces of entry information that store the division management information.

Processing for updating the contracted information 131 stored on the retaining unit 326 executed by the entry processing unit 301 is started by generating termination information (completion information and exceptional termination information). The generation is executed, as described above, by the write request unit 211 illustrated in FIG. 4 for completion information and by the descriptor control unit 216 for exceptional termination information.

The entry processing unit 301 determines, when termination information is generated, whether a number of termination entry information in which a transfer of the termination information has been terminated and an entry information number stored on the weakest number storage unit 133 illustrated in FIG. 5 are matched with each other.

The entry processing unit 301 executes update for increasing a number stored on the weakest number storage unit 133 by one when a determination result based on the determination indicates that a number of termination entry information and a number of entry information stored on the weakest number storage unit 133 are matched with each other. At that time, the entry processing unit 301 stores, when termination information is exceptional termination information, a flag (e.g. "1") indicating that an exceptional termination has occurred on the exceptional information storage unit 132 illustrated in FIG. 5.

The entry processing unit 301 further reads entry information of the same number as a number updated in the weakest number storage unit 133 from the descriptor 121 illustrated in FIG. 1. The entry processing unit 301 then determines whether termination information is stored in the read entry information. The entry processing unit 301 increases a number stored on the weakest number storage unit 133 by one when the determination result indicates that termination information is stored in the read entry information. At that time, when exceptional information is stored in the contracted information 131, the entry processing unit 301 maintains the exceptional information.

As described above, through sequential update execution, the contracted information 131 represents a number of entry information during execution of a weakest number and a presence/absence of an exceptional termination in transfer processings terminated so far.

The entry processing unit 301 executes the processing until transfers of all pieces of entry information are completed. When a largest number of entry information set for the weakest number storage unit 133 is stored, the contracted information 131 represents that the transfers of all pieces of entry information have been completed and a presence/absence of an exceptional termination. Therefore, the management unit 101 illustrated in FIG. 1 is able to interpret, when reading the contracted information 131, that the transfers of all pieces of entry information have been completed and a presence/absence of an exceptional termination.

Figure 7:
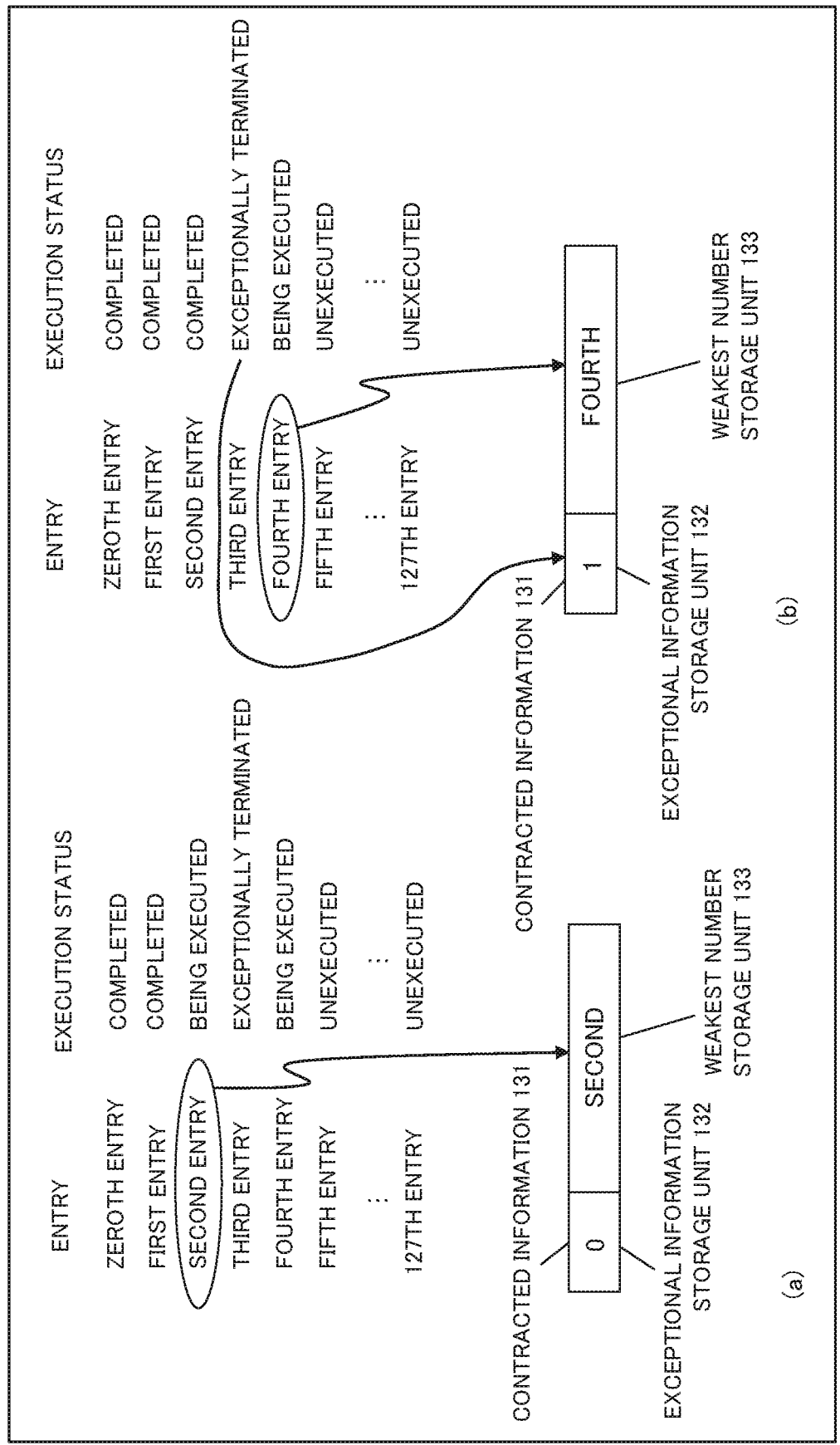
FIG. 7 is a diagram illustrating a specific example of a relation between an execution status of transfer processing for pieces of entry information and a content of contracted information.

FIG. 7 is a diagram illustrating a specific example of a relation between an execution status of transfer processing for pieces of entry information and a content of the contracted information 131. FIG. 7(*a*) is a specific example of the relation at a certain time after start of transfer processing executed by the transfer device 116a illustrated in FIG. 1. Further, FIG. 7(*b*) is a specific example of the relation at another certain time later than the time illustrated in FIG. 7(*a*).

At the time illustrated in FIG. 7(*a*), transfer processing has been completed for zeroth and first pieces of entry information, transfer processing has been exceptionally terminated for a third piece of entry information, and transfer processing is being executed for second and fourth pieces of entry information. In this case, the second is stored on the weakest number storage unit 133 of the contracted information 131. However, the third has not been stored yet on the weakest number storage unit 133, and therefore "0" representing that an exceptional termination has not occurred remains stored on the weakest number storage unit 132.

At the time illustrated in FIG. 7(*b*), transfer processing has been completed for zeroth to second pieces of entry information, transfer processing has been exceptionally terminated for a third piece of entry information, and transfer processing is being executed for a fourth piece of entry information. In this case, first, the third is stored on the weakest number storage unit 133 of the contracted information 131 and thereafter is rewritten to the fourth. Further, "1" representing that an exceptional termination has occurred is stored on the exceptional information storage unit 132, based on exceptional termination information relating to the third piece of entry information, when the third is stored on the weakest number storage unit 133. "1" of exceptional termination information is maintained as "1" even when a weakest number is rewritten to 4.

As illustrated in FIGS. 7(*a*) and 7(*b*), even when transfer processing started in a number order of entry information is terminated without a change in the order, a number of entry information having a weakest number being executed is stored on the weakest number storage unit 133.

Processing Flow

Figure 8:
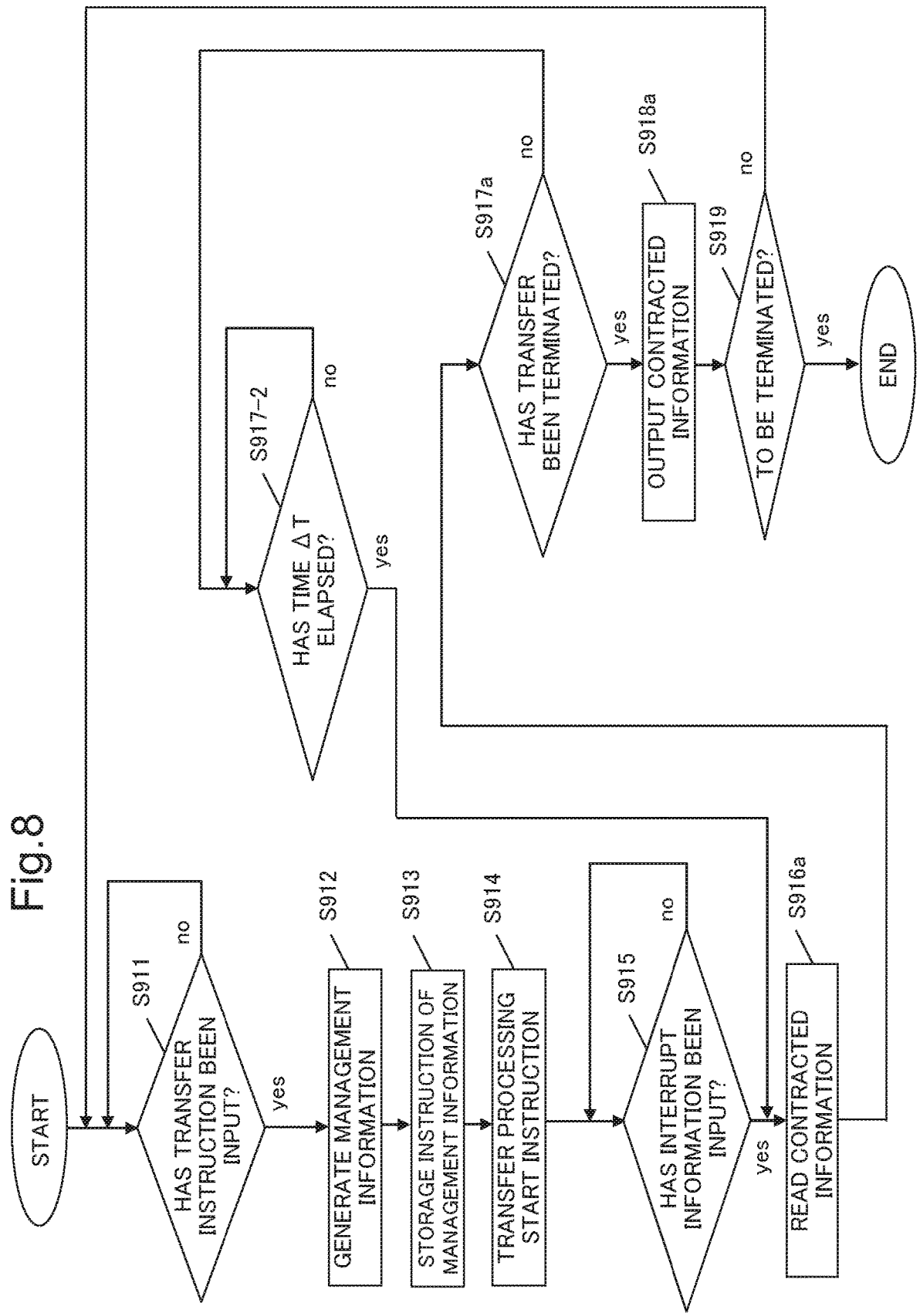
FIG. 8 is a conceptual diagram illustrating a processing flow example of processing executed by a management unit.

FIG. 8 is a conceptual diagram illustrating a processing flow example of processing executed by the management unit 101 illustrated in FIG. 1. The processing illustrated in FIG. 8 is processing in which the interrupt control unit 201 illustrated in FIG. 4 exists (operates).

The management unit 101 first determines, as processing of S911, whether a transfer instruction has been input from an outside. The input is, for example, input from a keyboard included in the management unit 101 executed by a user of the transfer device 116a illustrated in FIG. 1.

The management unit 101 executes processing of S912 when a determination result based on the processing of S911 is yes.

On the other hand, the management unit 101 executes processing of S911 again when a determination result based on the processing of S911 is no.

The management unit 101 derives, when executing processing of S912, as the processing, the management information described above. The management unit 101 executes the generation, for example, based on input information from a keyboard included in the management unit 101.

The management unit 101 instructs, as processing of S913, the descriptor 121 to store management information generated by the processing of S912.

The management unit 101 instructs, as processing of S914, the descriptor control unit 216 illustrated in FIG. 4 to start transfer processing for the management information.

The management unit 101 determines, as processing of S915, whether interrupt information has been input from the descriptor control unit 216.

The management unit 101 executes processing of S916a when a determination result based on the processing of S915 is yes.

On the other hand, the management unit 101 executes processing of S915 again when a determination result based on the processing of S915 is no.

The management unit 101 reads, when executing processing of S916a, as the processing, contracted information from the retaining unit 326 illustrated in FIG. 6.

The management unit 101 determines, as processing of S917a, whether transfer processing for all pieces of entry information to be targeted has been terminated from the contracted information read based on the processing of S916a. The management unit 101 executes the determination, for example, by determining whether a number stored on the weakest number storage unit 133 illustrated in FIG. 5 is larger than a maximum value of a number of entry information.

The management unit 101 executes processing of S917-2 when a determination result based on the processing of S917a is no.

On the other hand, the management unit 101 executes processing of S918a when a determination result based on the processing of S917a is yes.

The management unit 101 determines, when executing processing of S917-2, as the processing, whether a time ΔT has elapsed after termination of processing of S917a. The time ΔT is a threshold of an elapsed time previously determined in order to execute processing of S917-2. Setting of a time ΔT is executed, for example, by actually changing a time ΔT and selecting a value for executing a scheduled operation by the transfer device 116a illustrated in FIG. 1.

The management unit 101 executes processing of S916a again when a determination result based on the processing of S917-2 is yes.

On the other hand, the management unit 101 executes processing of S917-2 again when a determination result based on the processing of S917-2 is no.

The management unit 101 outputs, when executing processing of S918a, contracted information as the processing. The output is display, for example, on a display included in the management unit 101.

The management unit 101 determines, when executing processing of S919, as the processing, whether processing illustrated in FIG. 8 is terminated. The management unit 101 executes the determination by determining presence/absence of input of information for terminating processing illustrated in FIG. 8 from an outside.

The management unit 101 terminates the processing illustrated in FIG. 8 when a determination result based on the processing of S919 is yes.

On the other hand, the descriptor control unit 216 executes processing of S911 again when a determination result based on the processing of S919 is no.

When the interrupt control unit 201 illustrated in FIG. 4 does not exist (or does not operate), processing for starting a transfer and processing for confirming a transfer termination status executed by the management unit 101 may be independent of each other.

Processing for starting a transfer executed by the management unit 101 when the above processings are independent of each other is processing of eliminating processing from S915 to S918a and of executing processing of S919 following processing of S914 in the processing illustrated in FIG. 8.

Figure 9:
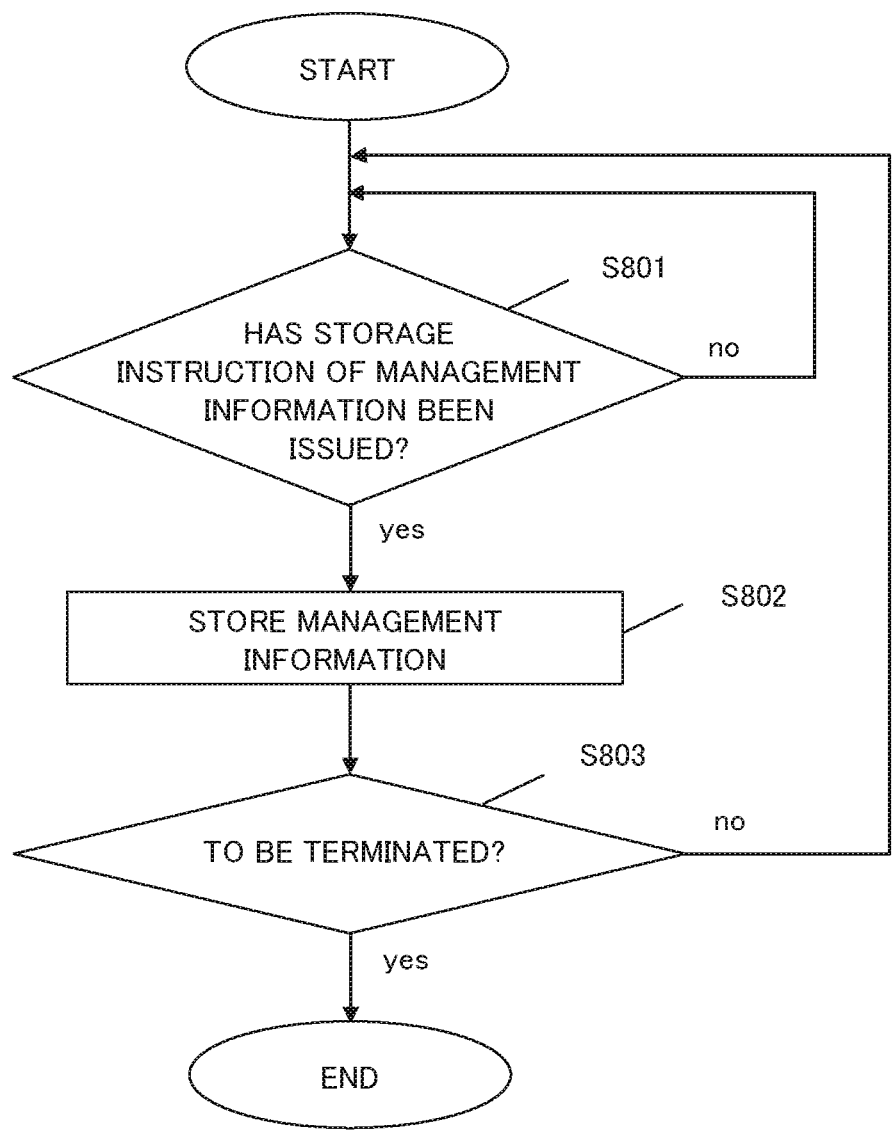
FIG. 9 is a conceptual diagram illustrating a processing flow example of management information storage processing executed by a descriptor.

FIG. 9 is a conceptual diagram illustrating a processing flow example of management information storage processing executed by the descriptor 121 illustrated in FIG. 1.

The descriptor 121 first determines, as processing of S801, whether a storage instruction of the management information described above has been issued from the management unit 101 illustrated in FIG. 1.

The descriptor 121 executes processing of S802 when a determination result based on the processing of S801 is yes.

On the other hand, the descriptor 121 executes processing of S801 again when a determination result based on the processing of S801 is no.

The descriptor 121 stores, when executing processing of S802, as the processing, management information in which existence of a storage instruction has been determined based on the processing of S801 in accordance with the storage instruction.

The descriptor 121 determines whether the processing illustrated in FIG. 9 should be terminated as processing of S803. The descriptor 121 executes the determination, for example, by determining presence/absence of input of information for terminating processing illustrated in FIG. 9 from an outside.

The descriptor 121 terminates the processing illustrated in FIG. 9 when a determination result based on the processing of S803 is yes.

On the other hand, the descriptor 121 executes processing of S801 again when a determination result based on the processing of S803 is no.

Figure 10:
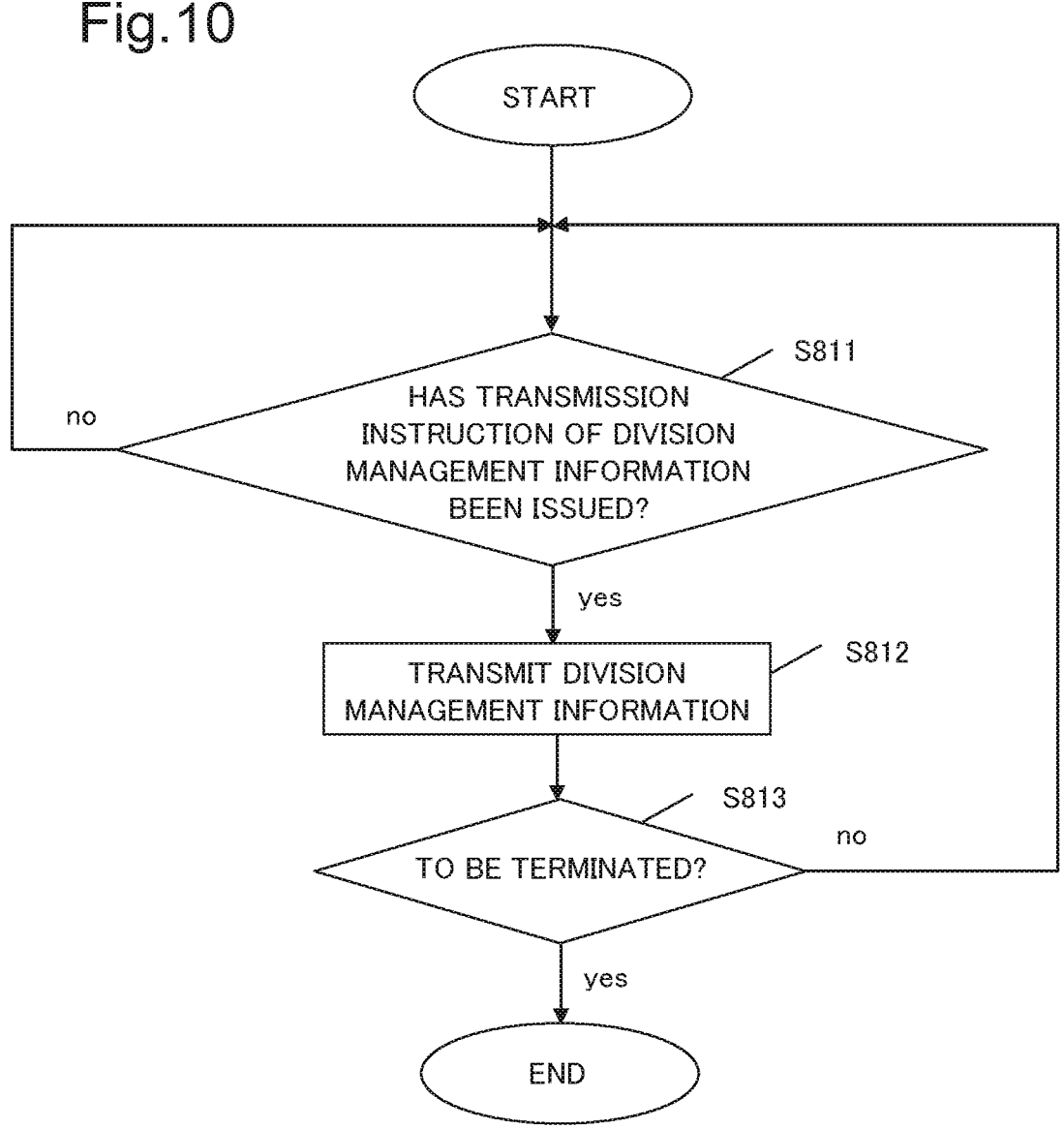
FIG. 10 is a conceptual diagram illustrating a processing flow example of transmission processing of division management information to a descriptor control unit.

FIG. 10 is a conceptual diagram illustrating a processing flow example of transmission processing of division management information to the descriptor control unit 216 illustrated in FIG. 4 executed by the descriptor 121 illustrated in FIG. 1.

The descriptor 121 first determines, as processing of S811, whether a transmission instruction of division management information has been issued from the descriptor control unit 216 illustrated in FIG. 4.

The descriptor 121 executes processing of S812 when a determination result based on the processing of S811 is yes.

On the other hand, the descriptor 121 executes processing of S811 again when a determination result based on the processing of S811 is no.

The descriptor 121 transmits, when executing processing of S812, as the processing, division management information in which existence of a transmission instruction has been determined based on the processing of S811 to the descriptor control unit 216.

The descriptor 121 determines, as processing of S813, whether processing illustrated in FIG. 10 is terminated. The descriptor 121 executes the determination, for example, by determining presence/absence of input of information for terminating the processing illustrated in FIG. 10 from an outside.

The descriptor 121 terminates the processing illustrated in FIG. 10 when a determination result based on the processing of S813 is yes.

On the other hand, the descriptor 121 executes processing of S811 again when a determination result based on the processing of S813 is no.

Figure 11:
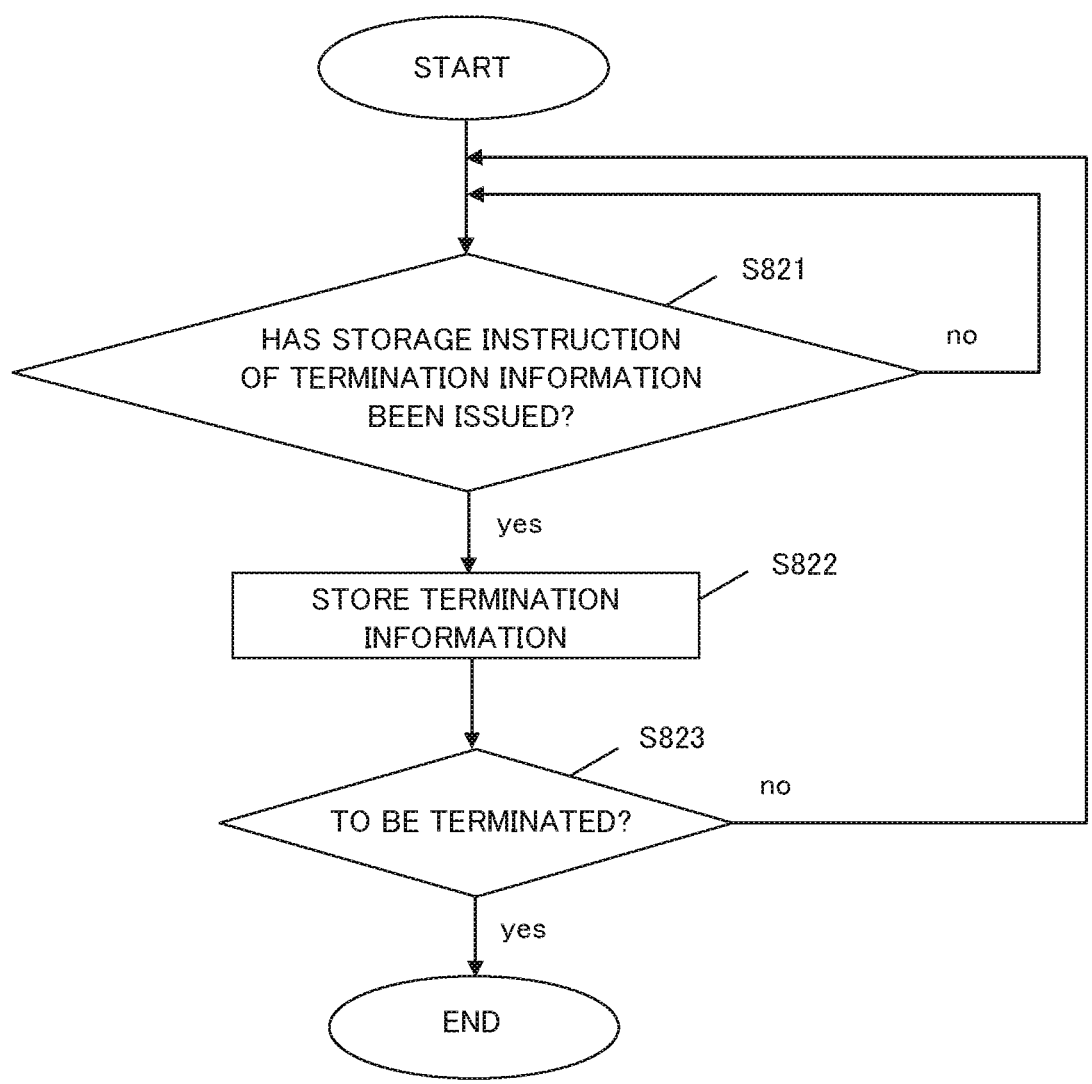
FIG. 11 is a conceptual diagram illustrating a processing flow example of processing of storing termination information.

FIG. 11 is a conceptual diagram illustrating a processing flow example of processing, executed by the descriptor 121, of storing termination information in accordance with an instruction from the descriptor control unit 216 illustrated in FIG. 4.

The descriptor 121 first determines, as processing of S821, whether a storage instruction of termination information for a certain piece of division management information has been issued from the descriptor control unit 216 illustrated in FIG. 4.

The descriptor 121 executes processing of S822 when a determination result based on the processing of S821 is yes.

On the other hand, the descriptor 121 executes processing of S821 again when a determination result based on the processing of S821 is no.

The descriptor 121 stores, when executing processing of S822, as the processing, termination information for division management information in which existence of a storage instruction has been determined based on the processing of S821.

The descriptor 121 determines whether the processing illustrated in FIG. 11 should be terminated as processing of S823. The descriptor 121 executes the determination, for example, by determining presence/absence of input of information for terminating processing illustrated in FIG. 11 from an outside.

The descriptor 121 terminates processing illustrated in FIG. 11 when a determination result based on the processing of S823 is yes.

On the other hand, the descriptor 121 executes processing of S821 again when a determination result based on the processing of S823 is no.

Figure 12:
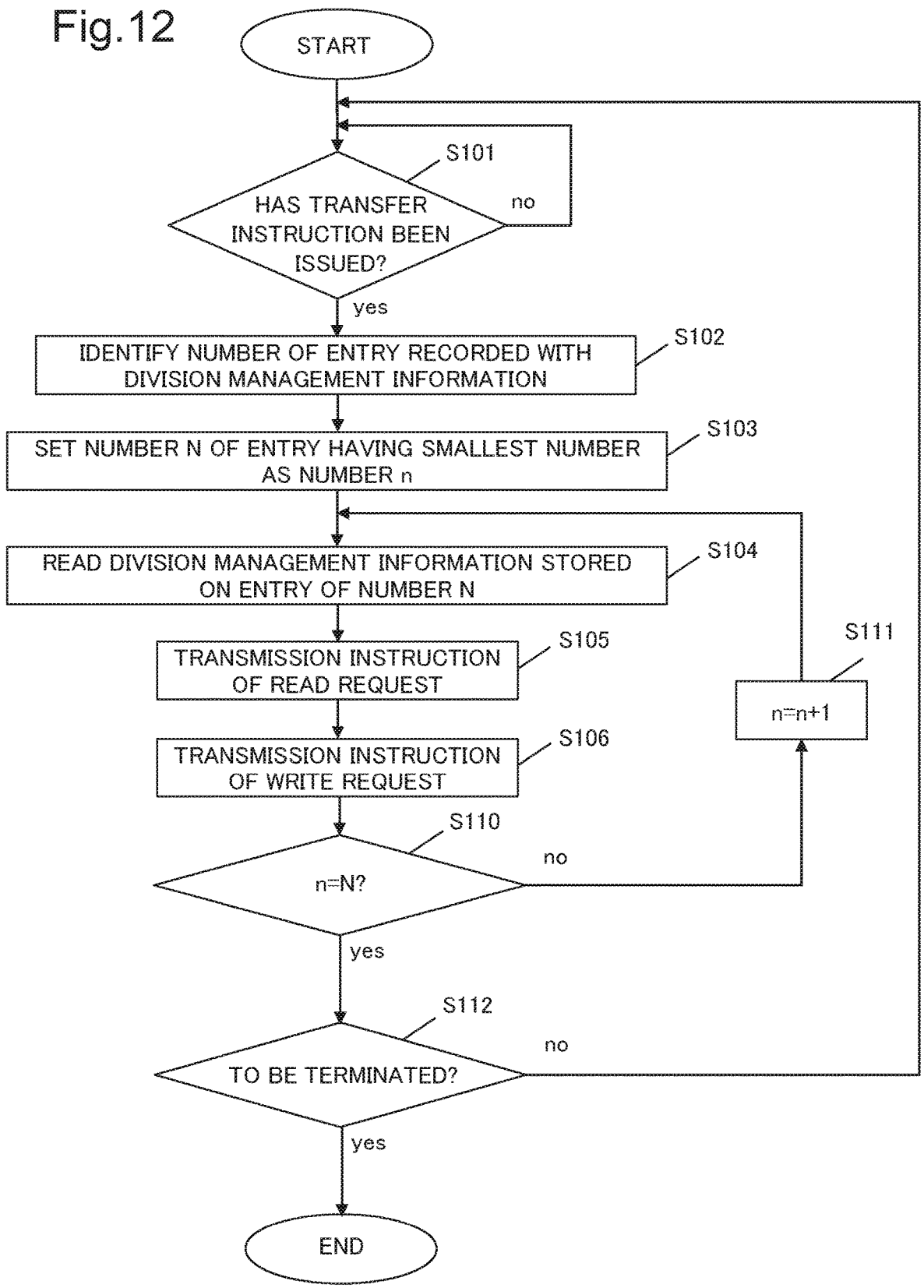
FIG. 12 is a conceptual diagram illustrating a processing flow example of information transfer related processing executed by a descriptor control unit.

FIG. 12 is a conceptual diagram illustrating a processing flow example of information transfer related processing executed by the descriptor control unit 216 illustrated in FIG. 4.

The descriptor control unit 216 first determines, as processing of S101, whether transfer instruction information has been transmitted from the management unit 101 illustrated in FIG. 1. It is assumed that the transfer instruction information includes information for identifying an entry group where the management information described above is recorded by the management unit 101.

The descriptor control unit 216 executes processing of S102 when a determination result based on the processing of S101 is yes.

On the other hand, the descriptor control unit 216 executes processing of S101 again when a determination result based on the processing of S101 is no.

The descriptor control unit 216 identifies, when executing processing of S102, as the processing, numbers of entries where division management information is recorded based on the transfer instruction information determined as having been transmitted based on the processing of S101.

The descriptor control unit 216 substitutes, as processing of S103, a smallest number N of the numbers of the entries identified based on the processing of S102 into a number n.

The descriptor control unit 216 reads, as processing of S104, division management information stored on an entry of the number n from the descriptor 121.

The descriptor control unit 216 instructs, as processing of S105, the read request unit 206 to transmit a read request for division transfer information identified by division management information stored on an entry of the number N to the recording unit 111a. The recording unit 111a related to the division transfer information identified by the division management information is a transfer source identified by the division management information.

The descriptor control unit 216 instructs, as processing of S106, the write request unit 211 to transmit a write request for the division transfer information identified by the division management information to the recording unit 111b. The recording unit 111b is a transfer destination identified by the division management information.

The descriptor control unit 216 determines, as processing of S110, whether a value of a number n is a number N. The number N is a largest number in an entry information group stored on the descriptor 121 illustrated in FIG. 1.

The descriptor control unit 216 executes processing of S112 when a determination result based on the processing of S110 is yes.

On the other hand, the descriptor control unit 216 executes processing of S111 when a determination result based on the processing of S110 is no.

The descriptor control unit 216 increases, when executing processing of S111, a value of the number n by one. The descriptor control unit 216 executes processing of S104 again.

The descriptor control unit 216 determines, when executing processing of S112, as the processing, whether processing illustrated in FIG. 12 is terminated. The descriptor control unit 216 executes the determination by determining presence/absence of input of information for terminating the processing illustrated in FIG. 12 from an outside.

The descriptor control unit 216 terminates the processing illustrated in FIG. 12 when a determination result based on the processing of S112 is yes.

On the other hand, the descriptor control unit 216 executes processing of S101 again when a determination result based on the processing of S112 is no.

Figure 13:
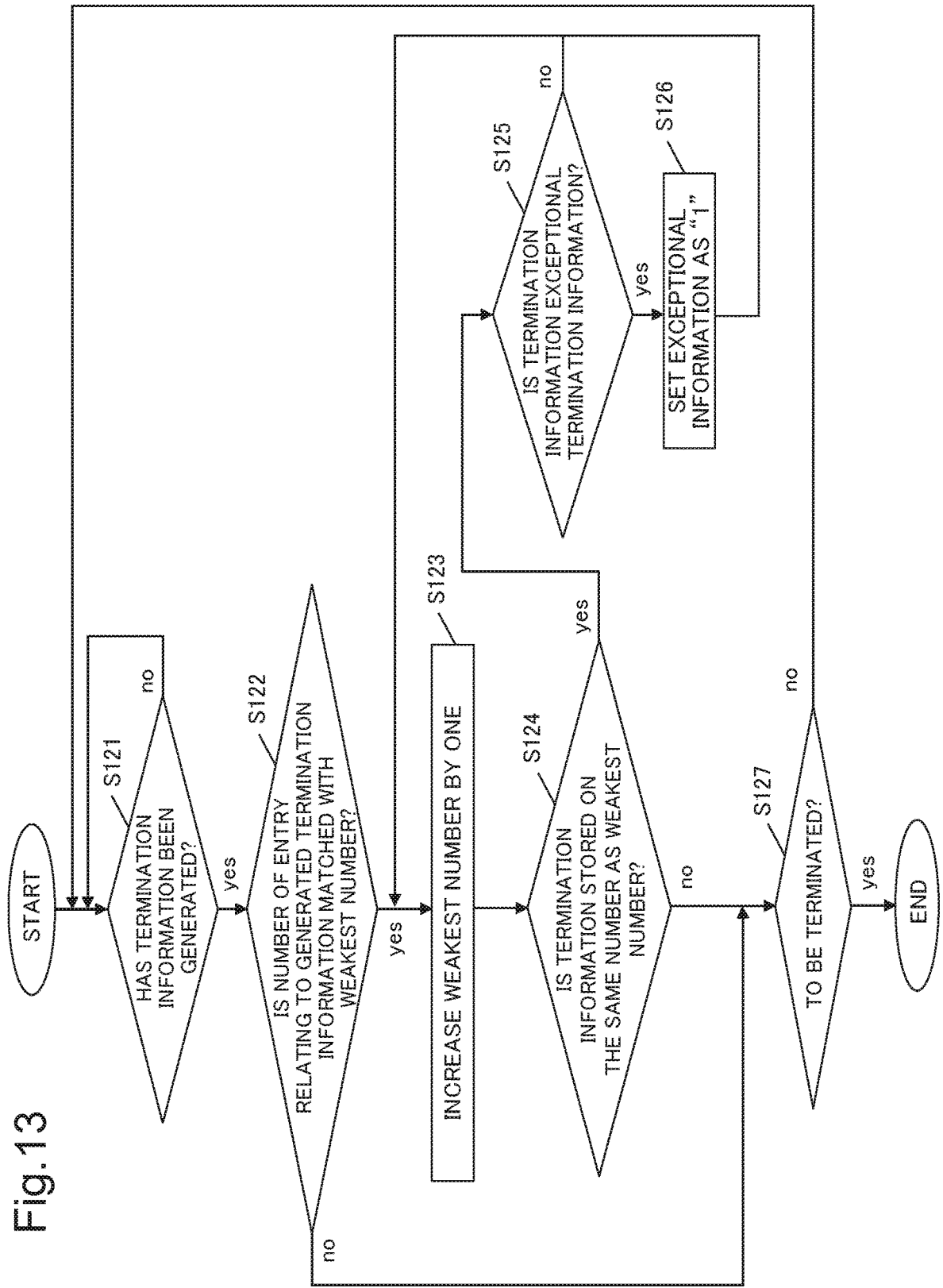
FIG. 13 is a conceptual diagram illustrating a processing flow example of update related processing of contracted information executed by a descriptor control unit.

FIG. 13 is a conceptual diagram illustrating a processing flow example of update related processing of the contracted information 131 executed by the descriptor control unit 216 illustrated in FIG. 4. When the descriptor control unit 216 is the descriptor control unit 216b illustrated in FIG. 6, processing illustrated in FIG. 13 is executed by the entry processing unit 301. The contracted information 131 is stored on the retaining unit 326.

The descriptor control unit 216 starts processing of FIG. 13, for example, by setting a power supply to be on.

The descriptor control unit 216 determines, as processing of S121, whether termination information has been generated. Termination information is generated by the write request unit 211 illustrated in FIG. 4 when the termination information is completion information and is transmitted to the entry processing unit 301. Further, termination information is generated by the entry processing unit 301 when the termination information is exceptional termination information.

The descriptor control unit 216 determines, as processing of S122, whether a number of entry information relating to termination information determined as having been generated by processing of S121 and a number of entry information stored on the weakest number storage unit 133 illustrated in FIG. 5 are matched with each other. In the following, it is assumed that a number of entry information stored on the weakest number storage unit 133 is referred to as a "weakest number".

The descriptor control unit 216 executes processing of S123 when a determination result based on the processing of S122 is yes.

On the other hand, the descriptor control unit 216 executes processing of S126 when a determination result based on the processing of S122 is no.

The descriptor control unit 216 increases, when executing processing of S123, as the processing, a weakest number by one. Note that, it is assumed that at a start time, even before transfer processing is started, a weakest number is "0".

The descriptor control unit 216 determines, as processing of S124, whether termination information is stored on entry information of the same number as a weakest number stored on the descriptor 121 illustrated in FIG. 1.

The descriptor control unit 216 executes processing of S125 when a determination result based on the processing of S124 is yes.

On the other hand, the descriptor control unit 216 executes processing of S127 when a determination result based on the processing of S124 is no.

The descriptor control unit 216 determines, when executing processing of S125, as the processing, whether termination information determined as being stored on the descriptor 121 in a determination process of S124 is exceptional termination information.

The descriptor control unit 216 executes processing of S126 when a determination result based on the processing of S125 is yes.

On the other hand, the descriptor control unit 216 executes processing of S123 again when a determination result based on the processing of S125 is no.

The descriptor control unit 216 sets, when executing processing of S126, as the processing, exceptional information as "1". However, the descriptor control unit 216 maintains "1" when exceptional information is already "1" at a processing start time of S126. Exceptional information is exceptional information stored on the exceptional information storage unit 132 illustrated in FIG. 5. Further, it is assumed that "1" of exceptional information indicates that an exceptional termination has occurred.

The descriptor control unit 216 determines, when executing processing of S127, as the processing, whether processing illustrated in FIG. 13 is terminated. The descriptor control unit 126 executes the determination, for example, by determining presence/absence of input of information for terminating the processing of FIG. 13 from an outside.

The descriptor control unit 216 terminates the processing illustrated in FIG. 13 when a determination result based on the processing of S127 is yes.

On the other hand, the descriptor control unit 216 executes processing of S121 again when a determination result based on the processing of S127 is no.

The descriptor control unit 216 instructs, when the transfer control unit 106a includes the interrupt control unit 201, the interrupt control unit 201 to transmit interrupt information to the management unit 101 when a determination result based on the processing of S121 is yes.

Figure 14:
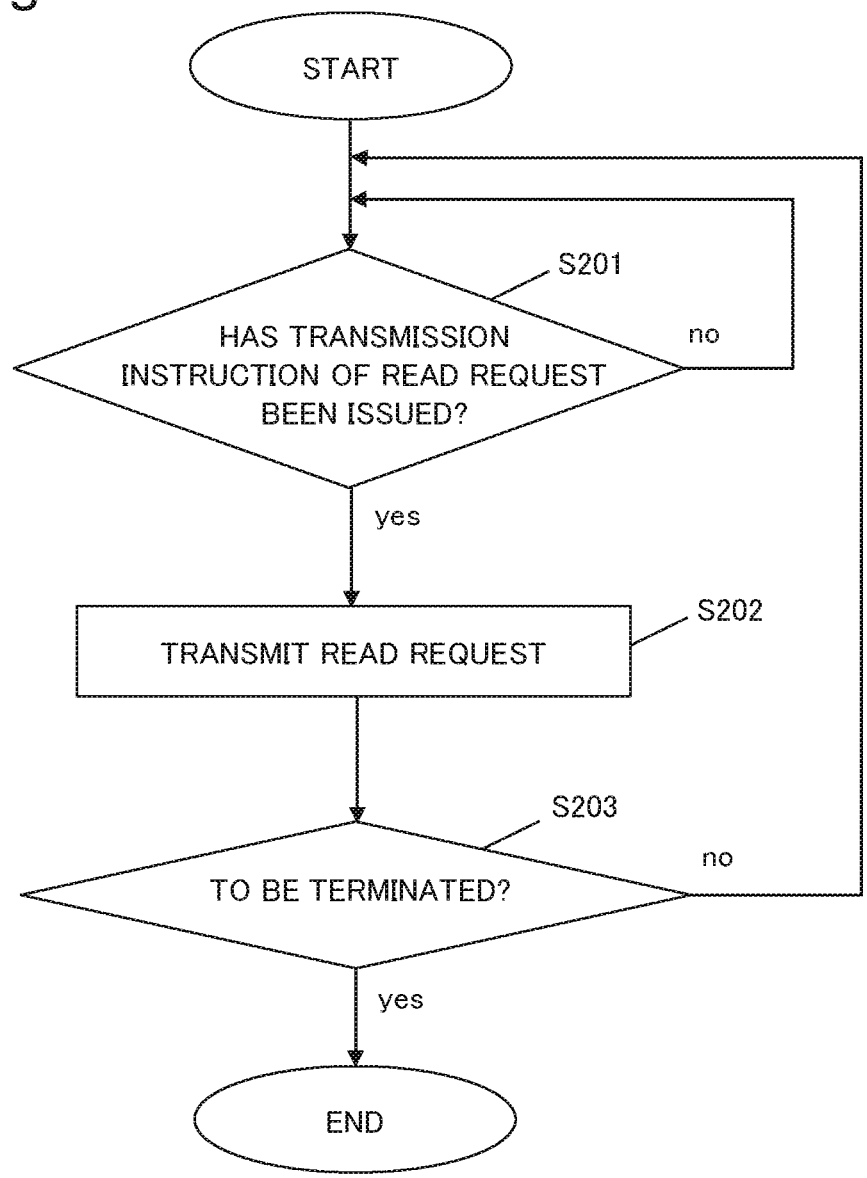
FIG. 14 is a conceptual diagram illustrating a processing flow example of processing executed by a read request unit.

FIG. 14 is a conceptual diagram illustrating a processing flow example of processing executed by the read request unit 206 illustrated in FIG. 4.

The read request unit 206 first determines, as processing of S201, whether a transmission instruction of a read request has been issued from the descriptor control unit 216.

The read request unit 206 executes processing of S202 when a determination result based on the processing of S201 is yes.

On the other hand, the read request unit 206 executes processing of S201 again when a determination result based on the processing of S201 is no.

The read request unit 206 transmits, when executing processing of S202, as the processing, a read request to the recording unit 111a.

The read request unit 206 determines, as processing of S203, whether processing illustrated in FIG. 14 is terminated. The read request unit 206 executes the determination, for example, by determining presence/absence of input of information for terminating the processing illustrated in FIG. 14 from an outside.

The read request unit 206 terminates the processing illustrated in FIG. 14 when a determination result based on the processing of S203 is yes.

On the other hand, the read request unit 206 executes processing of S201 again when a determination result based on the processing of S203 is no.

Figure 15:
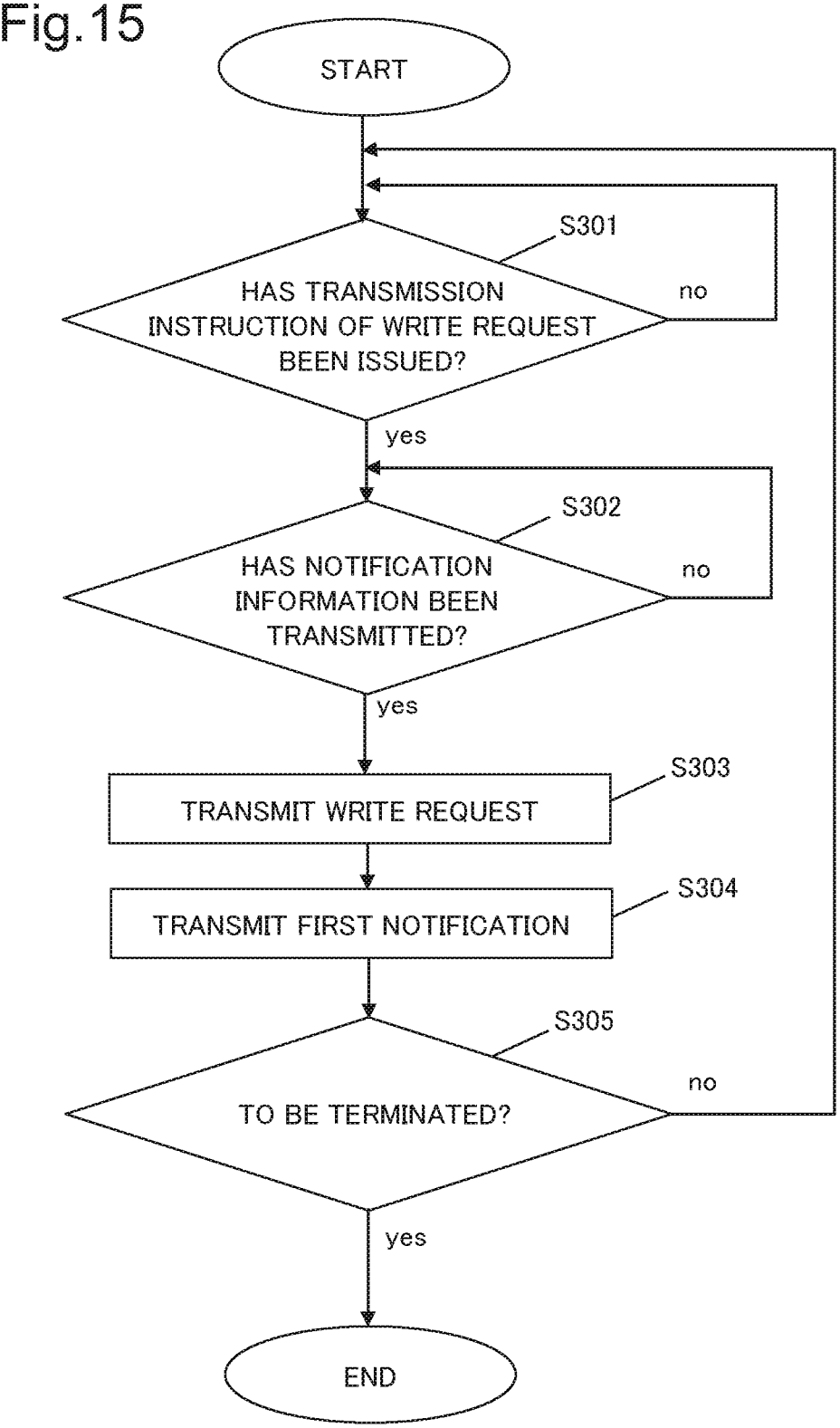
FIG. 15 is a conceptual diagram illustrating a processing flow example of processing executed by a write request unit.

FIG. 15 is a conceptual diagram illustrating a processing flow example of processing executed by the write request unit 211 illustrated in FIG. 4.

The write request unit 211 first determines, as processing of S301, whether a transmission instruction of a write request has been issued from the descriptor control unit 216.

The write request unit 211 executes processing of S302 when a determination result based on the processing of S301 is yes.

On the other hand, the write request unit 211 executes processing of S301 again when a determination result based on the processing of S301 is no.

The write request unit 211 determines, when executing processing of S302, as the processing, whether the notification information described above has been transmitted from the transfer processing unit 221.

The write request unit 211 executes processing of S303 when a determination result based on the processing of S302 is yes.

On the other hand, the write request unit 211 executes processing of S302 again when a determination result based on the processing of S302 is no.

The write request unit 211 transmits, when executing processing of S303, as the processing, a write request to the recording unit 111b.

The write request unit 211 transmits, as processing of S304, the first notification described above to the transfer processing unit 221.

The write request unit 211 determines, as processing of S305, whether the processing illustrated in FIG. 15 is terminated. The write request unit 211 executes the determination, for example, by determining presence/absence of input of information for terminating the processing illustrated in FIG. 15 from an outside.

The write request unit 211 terminates the processing illustrated in FIG. 15 when a determination result based on the processing of S305 is yes.

On the other hand, the write request unit 211 executes processing of S301 again when a determination result based on the processing of S305 is no.

Figure 16:
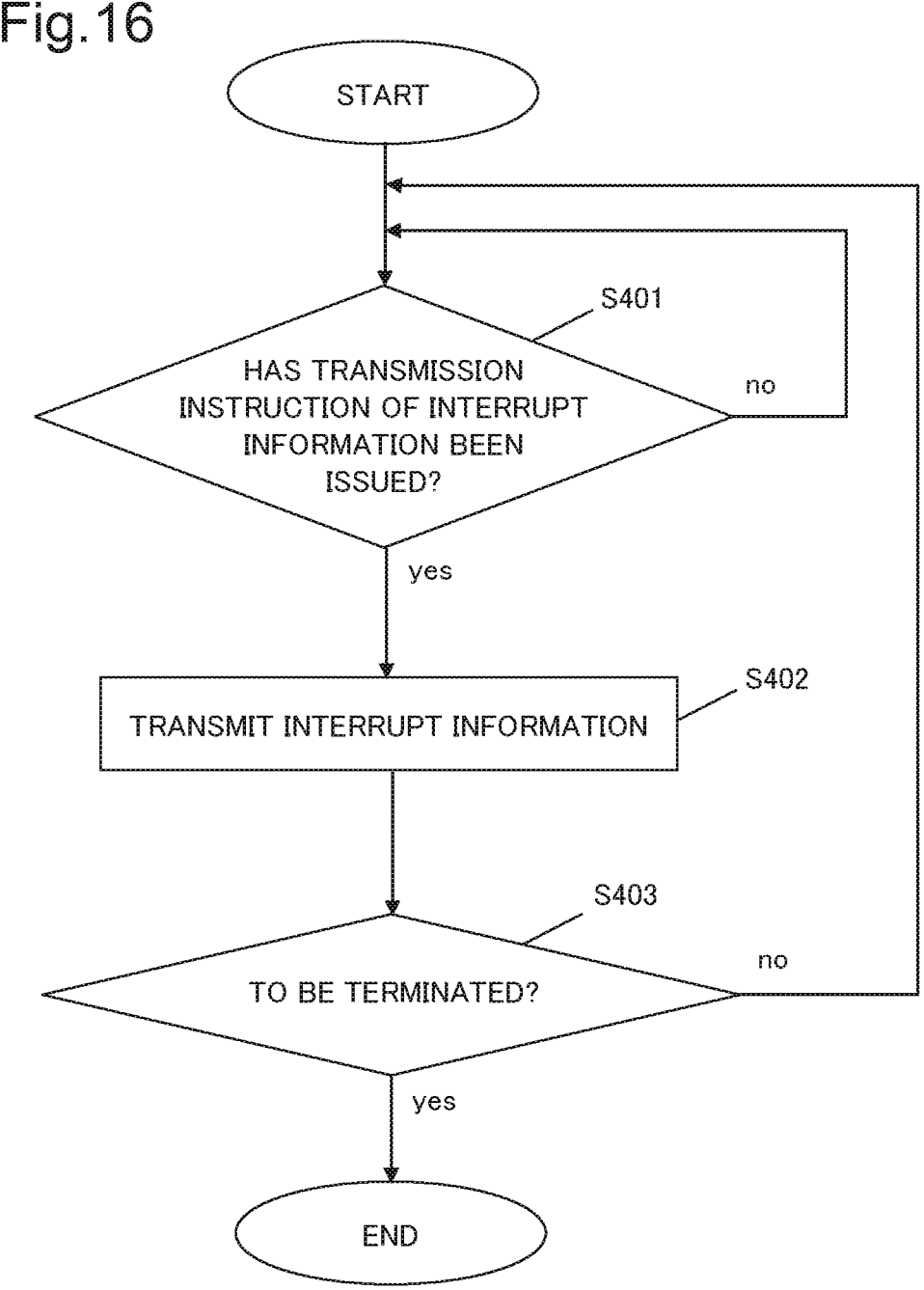
FIG. 16 is a conceptual diagram illustrating a processing flow example of processing executed by an interrupt control unit.

FIG. 16 is a conceptual diagram illustrating a processing flow example of processing executed by the interrupt control unit 201 illustrated in FIG. 4.

The interrupt control unit 201 first determines, as processing of S401, whether a transmission instruction of interrupt information has been issued from the descriptor control unit 216.

The interrupt control unit 201 executes processing of S402 when a determination result based on the processing of S401 is yes.

On the other hand, the interrupt control unit 201 executes processing of S401 again when a determination result based on the processing of S401 is no.

The interrupt control unit 201 transmits, when executing processing of S402, as the processing, interrupt information to the management unit 101 illustrated in FIG. 1.

The interrupt control unit 201 determines, as processing of S403, whether the processing illustrated in FIG. 16 is terminated. The interrupt control unit 201 executes the determination, for example, by determining presence/absence of input of information for terminating the processing illustrated in FIG. 16 from an outside.

The interrupt control unit 201 terminates the processing illustrated in FIG. 16 when a determination result based on the processing of S403 is yes.

On the other hand, the interrupt control unit 201 executes processing of S401 again when a determination result based on the processing of S403 is no.

Figure 17:
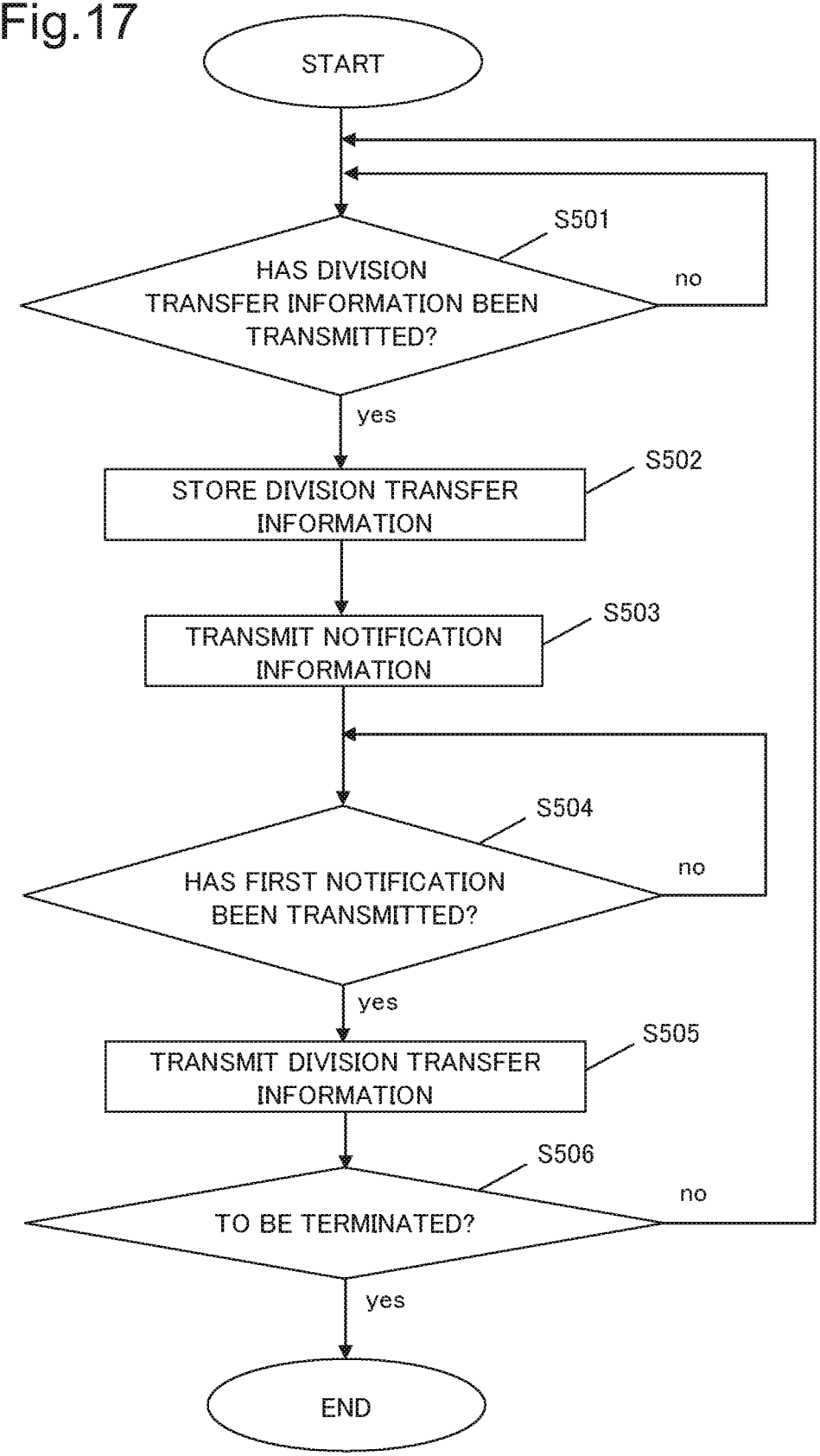
FIG. 17 is a conceptual diagram illustrating a processing flow example of processing executed by a transfer processing unit.

FIG. 17 is a conceptual diagram illustrating a processing flow example of processing executed by the transfer processing unit 221 illustrated in FIG. 4.

The transfer processing unit 221 first determines, as processing of S501, whether division transfer information has been transmitted from the recording unit 111*a* illustrated in FIG. 1.

The transfer processing unit 221 executes processing of S502 when a determination result based on the processing of S501 is yes.

On the other hand, the transfer processing unit 221 executes processing of S501 again when a determination result based on the processing of S501 is no.

The transfer processing unit 221 stores, when executing processing of S502, as the processing, division transfer information determined as having been transmitted based on the processing of S501.

The transfer processing unit 221 transmits, as processing of S503, the notification information described above to the write request unit 211 illustrated in FIG. 4.

The transfer processing unit 221 determines, as processing of S504, whether the first notification described above has been transmitted from the write request unit 211.

The transfer processing unit 221 executes processing of S505 when a determination result based on the processing of S504 is yes.

On the other hand, the transfer processing control unit 221 executes processing of S504 again when a determination result based on the processing of S504 is no.

The transfer processing unit 221 transmits, when executing processing of S505, as the processing, division transfer information stored based on the processing of S502 to the recording unit 111*b*.

The transfer processing unit 221 determines, as processing of S506, whether the processing illustrated in FIG. 17 is terminated. The transfer processing unit 221 executes the determination, for example, by determining presence/absence of input of information for terminating the processing illustrated in FIG. 17 from an outside.

The transfer processing unit 221 terminates the processing illustrated in FIG. 17 when a determination result based on the processing of S506 is yes.

On the other hand, the transfer processing control unit 221 executes processing of S501 again when a determination result based on the processing of S506 is no.

SPECIFIC EXAMPLE

Figure 18:
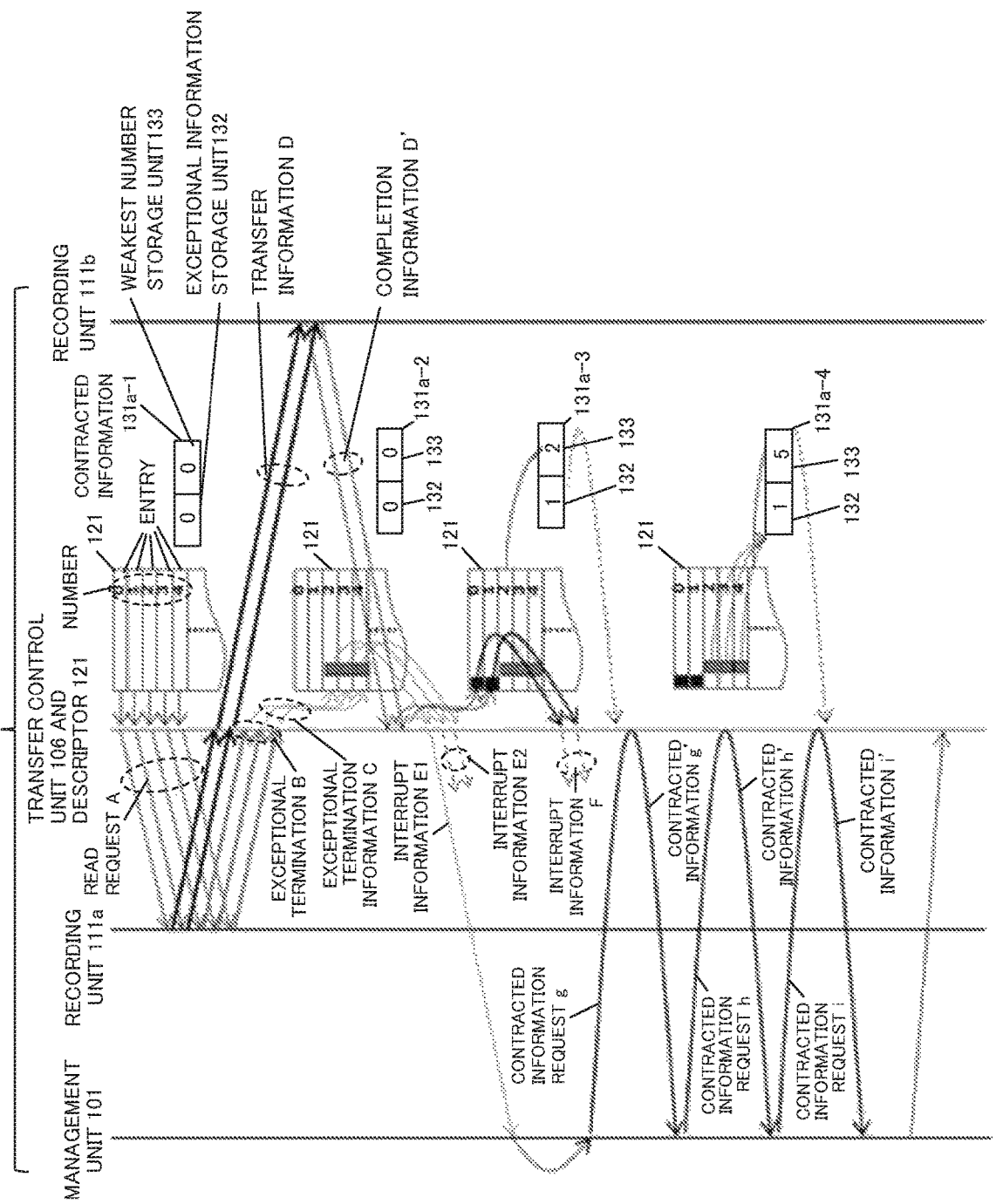
FIG. 18 is a diagram illustrating a specific example of a communication operation executed by a transfer device.

FIG. 18 is a diagram illustrating a specific example of a communication operation executed by the transfer device 116*a* illustrated in FIG. 1.

In the operation illustrated in FIG. 18, it is assumed that the descriptor 121 stores the management information described above transmitted by the management unit 101 to the descriptor 121, by dividing the information into five entries from a zeroth entry to a fourth entry. Further, in the operation illustrated in FIG. 18, it is assumed that the transfer device 116*a* completes transfer processing for division management information stored on the zeroth and first entries but exceptionally terminates transfer processing for division management information stored on the second to fourth entries.

"0" is stored as an initial value on the weakest number storage unit 133 of contracted information 131*a*-1 that is initial contracted information. Further, "0" indicating that exceptional termination is not executed is stored as an initial value on an exceptional information storage unit 132 of the contracted information 131*a*-1.

The transfer control unit 106 transmits a read request A including five read requests to the recoding unit 111*a*, based on pieces of division management information stored on entries of the descriptor 121 (processing of S105 of FIG. 12 and S201 and S202 of FIG. 14).

The recording unit 111*a* receives the read request A and tries five transfer processings (the processing illustrated in FIG. 17). Of the trials of these transfer processings, trials of transfer processings for division management information stored on the second to fourth entries are terminated without being completed, resulting in an exceptional termination B including three exceptional terminations (the assumption described above). In the transfer control unit 106, exceptional termination information C relating to these pieces of entry information is generated (S108 of FIG. 12). However, at that time, transfer processing for the first and second pieces of entry information having weaker numbers than the second to fourth ones has not been terminated and therefore termination information of the transfer has not been generated. Therefore, the transfer control unit 106 maintains a weakest number as 0 (no in S122 illustrated in FIG. 13) even when exceptional termination information relating to the second to fourth pieces of entry information is generated. Further, at that time, the transfer control unit 106 maintains exceptional information of the exceptional information storage unit 132 as "0" (no in S122 illustrated in FIG. 13). Contracted information 131*a*-2 illustrated in FIG. 18 indicates this state.

The transfer control unit 106 receives three pieces of exceptional termination information of the exceptional termination information C and generates three pieces of interrupt information (pieces of interrupt information E1 and E2).

The interrupt information E1 first generated from among the three pieces of interrupt information is transmitted to the management unit 101 (S401 and S402 of FIG. 16).

On the other hand, the interrupt information E2 is not transmitted to the management unit 101 or is neglected by the management unit 101 even when transmitted.

Further, interrupt information F generated by the transfer control unit 106 by receiving completion information D' is not transmitted to the management unit 101 or is neglected by the management unit 101 even when transmitted. The completion information D' is generated based on transfer completion of transfer information D.

The management unit 101 receives transmission of the interrupt information E1 and requests the transfer control unit 106 to transmit contracted information (a contracted information request g). Contracted information is a notification (first notification) in which the management unit 101 requests the transfer control unit 106 to transmit contracted information.

The transfer control unit 106 transmits contracted information g' that is contracted information 131*a* at the time of receiving the contracted information request g to the management unit 101.

It is assumed that the contracted information g' is contracted information 131*a*-3. The contracted information 131*a*-3 indicates a state (a state in a midway of the processing illustrated in FIG. 13) where transfer processing for zeroth and first pieces of entry information is completed, completion information of the termination is generated, and a second is stored on the weakest number storage unit 133 of the contracted information 131*a*-3. In the contracted information 131*a*-3, "1" that is exceptional information indicating that exceptional termination has occurred is stored on the exceptional information storage unit 132 (yes of S125 and S126 illustrated in FIG. 13).

Thereafter, the management unit 101 transmits contracted information requests h and i to the transfer control unit 106 at a predetermined interval.

The transfer control unit 106 receives the contracted information request h or i and transmits contracted information h' or i' that is contracted information 131*a* at the time of receiving the contracted information request h or i to the transfer control unit 106.

It is assumed that contracted information 131*a*-4 is the contracted information i'. At that time, the processing illustrated in FIG. 13 having been uncompleted at the time of the contracted information 131*a*-3 is completed, and "5" is stored on the weakest number storage unit 133. The fifth has a value larger by one than four that is a maximum value of a number of entry information to be processed.

A value of the contracted information i' is five, and therefore the management unit 101 interprets that transfer has been terminated. The management unit 101 further interprets that an exceptional termination has occurred in any one of the five pieces of entry information, based on "1" stored on the exceptional information storage unit 132 of the contracted information i'.

Advantageous Effect

In the transfer device of the present example embodiment, a transfer control unit stores contracted information acquired by contracting termination information (completion information and exceptional termination information) relating to entries in which management information is divided and stored. A management unit reads the contracted information at a predetermined timing. In the transfer device of the present example embodiment, there is neither transmission of interrupt information to a management unit with respect to each piece of termination information nor acquisition of termination information from each entry by using the management unit with respect to each piece of interrupt information executed by the transfer device of the present example embodiment.

Therefore, the transfer device of the present example embodiment is able to reduce the number of times of occurrences of transmission/reception executed among a management device, a transfer control unit, and a descriptor.

In the example embodiment described above, while a number was used as information representing each piece of entry information, information representing each piece of entry information is not limited to a number. Another symbol such as an alphabet and the like is applicable. Further, an order of symbols provided for pieces of entry information is not necessarily an ascending order and may be, for example, a descending order.

Further, when priority is assigned to information representing each piece of entry information, the information may be provided for each piece of entry information in priority order or provided in inverse order of priority.

Further, the rank order may or may not be matched with an order for starting transfer processing for each piece of entry information.

Figure 19:
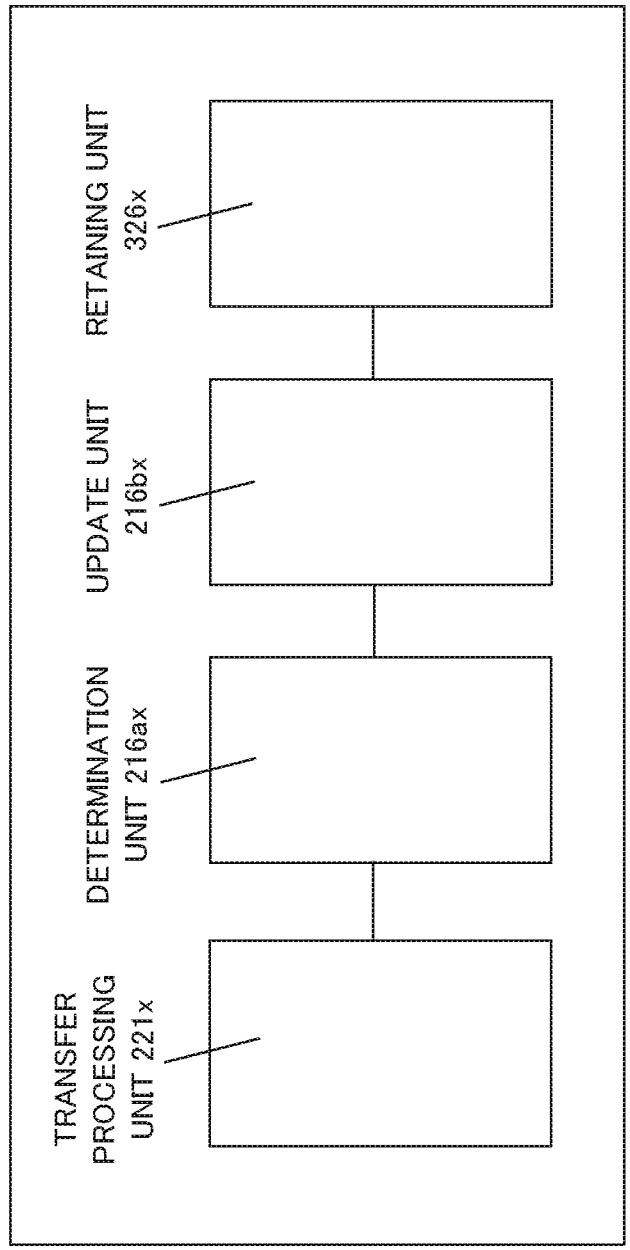
FIG. 19 is a block diagram illustrating a configuration of a minimum transfer control device of the present invention.

FIG. 19 is a block diagram illustrating a configuration of a transfer control device 106*x* that is a minimum configuration of the transfer control device of the present invention.

The transfer control unit 106*x* includes a transfer processing unit 221*x*, a determination unit 216*ax*, an update unit 216*bx*, and a retaining unit 326*x*.

The transfer processing unit 221*x* executes information transfers from a first recording unit to a second recording unit, based on a plurality of pieces of management information.

The determination unit 216*x* determines, with respect to contracted information representing termination statuses of partial transfers that are the information transfers associated with the plurality of pieces of management information, a termination of each of the partial transfers and thereby determines whether an update is to be executed.

The update unit 216*bx* executes the update when the determination unit 216*ax* determines that the update is to be executed.

The retaining unit 326*x* stores the contracted information and is able to provide the contracted information for a management device.

The transfer control unit 106*x* does not provide, with respect to each termination determination for the partial transfers, information recorded in association with each piece of division management information of the determination result for the management device. The transfer control device 106*x* provides the contracted information in which a result of the termination determination is contracted for management information.

The management device reads the contracted information and thereby interprets a termination status of the information transfer.

When information is provided for the management information with respect to each termination determination of the partial transfers, a large number of transmission/reception processings occur in order for the management device to interpret a termination status of the information transfer. However, the management device merely reads the contracted information, and therefore the transfer control device 106*x* is able to reduce a large number of transmission/reception processings for interpreting a termination status.

Therefore, the transfer control device 106*x* is able to reduce the number of times of occurrences of transmission/reception processings executed by the management device in order for the management device to interpret a termination status of the information transfer.

Therefore, the transfer control device 106*x* produces an advantageous effect described in the section of [Advantageous Effects of Invention] by employing the configuration.

While example embodiments of the present invention have been described, the present invention is not limited to these example embodiments, and further variations, substitutions, and adjustments may be added without departing from the basic technical idea of the present invention. For example, a configuration of elements illustrated in drawings is one example for helping understanding of the present invention and is not limited to the configuration illustrated in these drawings.

The whole or part of the example embodiments disclosed above can be described as, but not limited to, the following supplementary notes.

(Supplementary note 1)

A transfer control device including:

a transfer processing means that executes an information transfer from a first recording means to a second recording means, based on each of a plurality of pieces of management information;

a determination means that determines whether to execute an update of contracted information representing a termination status of a partial transfer being the information transfer associated with each of the plurality of pieces of the management information, by determining a termination of each of the partial transfers;

an update means that executes the update when the determination means determines that the update is to be executed; and a storage means that stores the contracted information and is able to provide the contracted information for a management device.

(Supplementary note 2)

The transfer control device according to supplementary note 1, wherein the contracted information includes information representing the management information relating to the information transfer started earliest of the information transfers for which the termination has not been determined while at least the information transfers are executed.

(Supplementary note 3)

The transfer control device according to supplementary note 1 or 2, wherein the contracted information includes information representing the management information relating to the information transfer scheduled to be started earliest before the information transfers are started.

(Supplementary note 4)

The transfer control device according to supplementary note 1, wherein the contracted information includes information representing the management information relating to the information transfer having a highest order of the information transfers for which the termination has not been determined while at least the information transfers are executed.

(Supplementary note 5)

The transfer control device according to supplementary note 1 or 4, wherein the contracted information includes information representing the management information having a highest order of the plurality of pieces of the management information before the information transfers are started.

(Supplementary note 6)

The transfer control device according to supplementary note 1, wherein the contracted information includes, in a symbol sequence including symbols set for the plurality of respective pieces of the management information, the symbol of the management information set with an endmost symbol among pieces of the management information relating to the information transfers for which the termination has not been determined while at least the information transfers are executed.

(Supplementary note 7)

The transfer control device according to supplementary note 1, wherein the contracted information includes, in a symbol sequence including symbols set for the plurality of respective pieces of the management information, the symbol of the management information set with an endmost symbol before the information transfers are started.

(Supplementary note 8)

The transfer control device according to supplementary note 6 or 7, wherein the symbol is a number.

(Supplementary note 9)

The transfer control device according to any one of supplementary notes 1 to 8, wherein the contracted information includes information that is not information representing each of the plurality of pieces of the management information after the termination is determined with respect to the information transfers relating to the plurality of pieces of the management information.

(Supplementary note 10)

The transfer control device according to any one of supplementary notes 1 to 9, which executes the provision.

(Supplementary note 11)

The transfer control device according to supplementary note 10, wherein the storage means executes the provision, based on a first notification from the management device.

(Supplementary note 12)

The transfer control device according to supplementary note 11, wherein the first notification is information that requests the provision.

(Supplementary note 13)

The transfer control device according to supplementary note 11 or 12, wherein a second notification is issued to the management device by determining the termination and the provision is executed based on the second notification.

(Supplementary note 14)

The transfer control device according to supplementary note 13, wherein the second notification is interrupt information for causing the management device to transmit the first notification.

(Supplementary note 15)

The transfer control device according to any one of supplementary notes 1 to 14, wherein the update means executes the update every time the determination is executed.

(Supplementary note 16)

The transfer control device according to any one of supplementary notes 1 to 15, wherein the plurality of pieces of the management information are transmitted from the management device.

(Supplementary note 17)

The transfer control device according to any one of supplementary notes 1 to 16, wherein the plurality of pieces of the management information include information representing a transfer source, information representing a transfer destination, and information representing a transfer target.

(Supplementary note 18)

The transfer control device according to supplementary note 17, wherein the information representing the transfer source is an address of the transfer source.

(Supplementary note 19)

The transfer control device according to supplementary note 17 or 18, wherein the information representing the transfer destination is an address of the transfer destination.

(Supplementary note 20)

The transfer control device according to any one of supplementary notes 17 to 19, wherein the information representing the transfer target is information that identifies a portion in transfer target.

(Supplementary note 21)

The transfer control device according to any one of supplementary notes 1 to 20, wherein the contracted information includes information representing presence/absence of occurrence of a midway termination of the partial transfer.
(Supplementary note 22)
The transfer control device according to supplementary note 21, wherein the midway termination is an exceptional transfer termination.
(Supplementary note 23)
The transfer control device according to supplementary note 22, wherein the exceptional transfer termination is executed when an access violation to a predetermined address occurs.
(Supplementary note 24)
The transfer control device according to any one of supplementary notes 1 to 23, wherein the transfer processing means executes the information transfer, based on the plurality of pieces of the management information stored on a descriptor.
(Supplementary note 25)
The transfer control device according to any one of supplementary notes 1 to 24, wherein the transfer processing means executes the information transfer, based on each of the plurality of pieces of the management information stored on each of divided recording areas.
(Supplementary note 26)
The transfer control device according to supplementary note 25, wherein the divided recording area is a recording area of a descriptor.
(Supplementary note 27)
The transfer control device according to any one of supplementary notes 1 to 26, wherein the information transfer is a DMA transfer being a direct memory access transfer.
(Supplementary note 28)
A transfer device including: the transfer control device according to any one of supplementary notes 1 to 27; and the management device.
(Supplementary note 29)
A transfer control method including:
executing an information transfer from a first recording means to a second recording means, based on each of a plurality of pieces of management information;
determining whether to execute an update of contracted information representing a termination status of a partial transfer being the information transfer associated with each of the plurality of pieces of the management information, by determining a termination of each of the partial transfers;
executing the update when determining that the update is to be executed; and
storing the contracted information and providing the contracted information for a management device.
(Supplementary note 30)
A recording medium recording a transfer control program that causes a computer to execute:
processing of executing an information transfer from a first recording means to a second recording means, based on each of a plurality of pieces of management information;
processing of determining whether to execute an update of contracted information representing a termination status of a partial transfer being the information transfer associated with each of the plurality of pieces of the management information, by determining a termination of each of the partial transfers;
processing of executing the update when determining that the update is to be executed; and
processing of storing the contracted information and providing the contracted information for a management device.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-7613 filed on Jan. 19, 2017, the disclosure of which is incorporated herein in its entirety by reference.

REFERENCE SIGNS LIST

101 Management unit
106, 106a Transfer control unit
106x Transfer control device
111a, 111b Recording unit
116a Transfer device
121, 121a Descriptor
126 Entry information
127 Number information storage unit
128 Division management information storage unit
129 Termination information storage unit
131, 131a-1, 131a-2, 131a-3, 131a-4 Contracted information
132 Exceptional information storage unit
133 Weakest number storage unit
201 Interrupt control unit
206 Read request unit
211 Write request unit
216 Descriptor control unit
216ax Determination unit
216bx Update unit
221, 221x Transfer processing unit
301 Entry processing unit
311 Number update unit
316 Storage unit
321 Transfer control unit
326, 326x Retaining unit
A Read request
B Exceptional termination
C Exceptional termination information
D Transfer information
D' Completion information
E, F Interrupt information
g, h, i Contracted information request
g', h', i' Contracted information

What is claimed is:
1. A transfer control device including:
a transfer processor that executes an information transfer from a first recorder to a second recorder, based on each of a plurality of pieces of management information;
a determination processor that determines whether to execute an update of contracted information representing a termination status of a partial transfer being the information transfer associated with each of the plurality of pieces of the management information, by determining a termination of each of the partial transfers;
an update processor that executes the update when the determination processor determines that the update is to be executed; and
a storage that stores the contracted information and is able to provide the contracted information for a management device, wherein, the storage does not provide, with respect to each termination determination for the partial transfers, information recorded in association with each piece of division management information of the determination result for the management device, and provides the contracted information in which a result of the termination determination is contracted for the management information.

2. The transfer control device according to claim 1, wherein the contracted information includes information representing the management information relating to the information transfer started earliest of the information transfers for which the termination has not been determined while at least the information transfers are executed.

3. The transfer control device according to claim 1, wherein the contracted information includes information representing the management information relating to the information transfer scheduled to be started earliest before the information transfers are started.

4. The transfer control device according to claim 1, wherein the contracted information includes information representing the management information relating to the information transfer having a highest order of the information transfers for which the termination has not been determined while at least the information transfers are executed.

5. The transfer control device according to claim 1, wherein the contracted information includes information representing the management information having a highest order of the plurality of pieces of the management information before the information transfers are started.

6. The transfer control device according to claim 1, wherein the contracted information includes, in a symbol sequence including symbols set for the plurality of respective pieces of the management information, the symbol of the management information set with an endmost symbol among pieces of the management information relating to the information transfers for which the termination has not been determined while at least the information transfers are executed.

7. The transfer control device according to claim 1, wherein the contracted information includes, in a symbol sequence including symbols set for the plurality of respective pieces of the management information, the symbol of the management information set with an endmost symbol before the information transfers are started.

8. The transfer control device according to claim 6, wherein the symbol is a number.

9. The transfer control device according to claim 1, wherein the contracted information includes information that is not information representing each of the plurality of pieces of the management information after the termination is determined with respect to the information transfers relating to the plurality of pieces of the management information.

10. The transfer control device according to claim 1, wherein the device provides the contracted information.

11. The transfer control device according to claim 10, wherein the storage provides the contracted information, based on a first notification from the management device.

12. The transfer control device according to claim 11, wherein the first notification is information that requests to provide the contracted information.

13. The transfer control device according to claim 11, wherein a second notification is issued to the management device by determining the termination and provides the contracted information based on the second notification.

14. The transfer control device according to claim 13, wherein the second notification is interrupt information for causing the management device to transmit the first notification.

15. The transfer control device according to claim 1, wherein the update processor executes the update every time the determination is executed.

16. The transfer control device according to claim 1, wherein the plurality of pieces of the management information are transmitted from the management device.

17. The transfer control device according to claim 1, wherein the plurality of pieces of the management information include information representing a transfer source, information representing a transfer destination, and information representing a transfer target.

18. The transfer control device according to claim 17, wherein the information representing the transfer source is an address of the transfer source.

19. A transfer control method including:
executing an information transfer from a first recorder to a second recorder, based on each of a plurality of pieces of management information;
determining whether to execute an update of contracted information representing a termination status of a partial transfer being the information transfer associated with each of the plurality of pieces of the management information, by determining a termination of each of the partial transfers;
executing the update when determining that the update is to be executed;
storing the contracted information and providing the contracted information for a management device;
not providing, with respect to each termination determination for the partial transfers, information recorded in association with each piece of division management information of the determination result for the management device; and
providing the contracted information in which a result of the termination determination is contracted for the management information.

20. A non-transitory computer readable medium recorded with a transfer control program that causes a computer to execute:
processing of executing an information transfer from a first recorder to a second recorder, based on each of a plurality of pieces of management information;
processing of determining whether to execute an update of contracted information representing a termination status of a partial transfer being the information transfer associated with each of the plurality of pieces of the management information, by determining a termination of each of the partial transfers;
processing of executing the update when determining that the update is to be executed;
processing of storing the contracted information and providing the contracted information for a management device;
no processing of providing, with respect to each termination determination for the partial transfers, information recorded in association with each piece of division management information of the determination result for the management device, and
processing of providing the contracted information in which a result of the termination determination is contracted for the management information.

* * * * *